US008643957B2

(12) United States Patent
Chen et al.

(10) Patent No.: US 8,643,957 B2
(45) Date of Patent: Feb. 4, 2014

(54) OPTICAL IMAGE SYSTEM

(75) Inventors: Chun-Shan Chen, Taichung (TW); Tsung-Han Tsai, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/615,749

(22) Filed: Sep. 14, 2012

(65) Prior Publication Data

US 2013/0235473 A1  Sep. 12, 2013

(30) Foreign Application Priority Data

Mar. 9, 2012  (TW) .............................. 101108104 A

(51) Int. Cl.
*G02B 13/18* (2006.01)
*G02B 9/62* (2006.01)

(52) U.S. Cl.
USPC .......................................... 359/713; 359/756

(58) Field of Classification Search
USPC ........................ 359/713, 756–762
See application file for complete search history.

(56) References Cited

U.S. PATENT DOCUMENTS

| | | |
|---|---|---|
| 5,691,851 A | 11/1997 | Nishio et al. |
| 8,000,031 B1 | 8/2011 | Tsai |
| 2013/0003193 A1* | 1/2013 | Huang .......................... 359/713 |
| 2013/0033762 A1* | 2/2013 | Tsai et al. ..................... 359/713 |

* cited by examiner

*Primary Examiner* — Scott J Sugarman
(74) *Attorney, Agent, or Firm* — CKC & Partners Co., Ltd.

(57) ABSTRACT

An optical image system includes, in order from an object side to an image side, the first lens element with positive refractive power having a convex object-side surface; the second lens element with refractive power; the third lens element with positive refractive power having at least one surface being aspheric; the fourth lens element with refractive power having a concave object-side surface and a convex image-side surface, wherein at least one surface thereof element is aspheric; the fifth lens element with positive refractive power having a convex image-side surface; and the sixth lens element with negative refractive power made of plastic material and having a concave image-side surface, wherein at least one surface thereof is aspheric, and the image-side surface thereof changes from concave at a paraxial region to convex at a peripheral region.

28 Claims, 20 Drawing Sheets

OPTICAL IMAGE SYSTEM

RELATED APPLICATIONS

The application claims priority to Taiwan Application Serial Number 101108104, filed Mar. 9, 2012, which is herein incorporated by reference.

BACKGROUND

1. Technical Field

The present invention relates to an optical image system. More particularly, the present invention relates to a compact optical image system applicable to electronic products.

2. Description of Related Art

In recent years, with the popularity of mobile products with camera functionalities, the demand for miniaturizing an optical lens system is increasing. The sensor of a conventional photographing camera is typically a CCD (Charge-Coupled Device) or a CMOS (Complementary Metal-Oxide-Semiconductor) sensor. As advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a five-element lens structure. Due to the popularity of mobile products with high-end specifications, such as smart phones and PDAs (Personal Digital Assistants), the pixel and mage-quality requirements of the compact optical lens system have increased rapidly. However, the conventional five-element lens structure cannot satisfy the requirements of the compact optical lens system. Therefore, a need exists in the art for providing an optical lens system for use in a mobile electronic product that has excellent imaging quality without excessive total track length.

SUMMARY

According to one aspect of the present disclosure, an optical image system includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element with positive refractive power has at least one of an object-side surface and an image-side surface being aspheric. The fourth lens element with refractive power has a concave object-side surface and a convex image-side surface, wherein at least one of the object-side surface and the image-side surface of the fourth lens element is aspheric. The fifth lens element with positive refractive power has a convex image-side surface. The sixth lens element with negative refractive power is made of plastic material and has a concave image-side surface, wherein at least one of an object-side surface and the image-side surface of the sixth lens element is aspheric, and the image-side surface of the sixth lens element changes from concave at a paraxial region to convex at a peripheral region. When a focal length of the optical image system is f, a focal length of the first lens element is f1, a focal length of the second lens element is f2, and a focal length of the third lens element is f3, the following relationships are satisfied:

$$0 < |f/f1| + |f/f2| < 1.35;\text{ and}$$

$$0 < f3/f1 < 2.0.$$

According to another aspect of the present disclosure, an optical image system includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element with positive refractive power has at least one of an object-side surface and an image-side surface being aspheric. The fourth lens element with negative refractive power has a concave object-side surface and a convex image-side surface, wherein at least one of the object-side surface and the image-side surface of the fourth lens element is aspheric. The fifth lens element with positive refractive power has a convex image-side surface. The sixth lens element with negative refractive power is made of plastic material and has a concave image-side surface, wherein at least one of an object-side surface and the image-side surface of the sixth lens element is aspheric, and the image-side surface of the sixth lens element changes from concave at a paraxial region to convex at a peripheral region. When a focal length of the optical image system is f, a focal length of the first lens element is f1, a focal length of the third lens element is f3, and a focal length of the fourth lens element is f4, the following relationships are satisfied:

$$0 < f3/f1 < 2.0;\text{ and}$$

$$1.0 < |f/f3| + |f/f4| < 2.7.$$

According to further another aspect of the present disclosure, an optical image system includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element with positive refractive power has at least one of an object-side surface and an image-side surface being aspheric. The fourth lens element with refractive power has a concave object-side surface and a convex image-side surface, wherein at least one of the object-side surface and the image-side surface of the fourth lens element is aspheric. The fifth lens element with positive refractive power has a convex image-side surface. The sixth lens element with negative refractive power is made of plastic material and has a concave image-side surface, wherein at least one of an object-side surface and the image-side surface of the sixth lens element is aspheric, and the image-side surface of the sixth lens element changes from concave at a paraxial region to convex at a peripheral region. When a focal length of the optical image system is f, a focal length of the first lens element is f1, a focal length of the second lens element is f2, a focal length of the third lens element is f3, and a focal length of the fourth lens element is f4, the following relationships are satisfied:

$$0 < |f/f1| + |f/f2| < 1.35;\text{ and}$$

$$1.0 < |f/f3| + |f/f4| < 2.7.$$

According to yet another aspect of the present disclosure, an optical image system includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element with positive refractive power has at least one of an object-side surface and an image-side surface being aspheric. The fourth lens element with negative refractive power has a concave object-side surface and a convex image-side surface, wherein at least one of the object-side surface and the image-side surface of the fourth lens element is aspheric. The fifth lens element with positive refractive power has a convex image-side surface. The sixth lens element with negative refractive power is made of plastic material and has a concave mage-side surface, wherein at least one of an object-side surface and the image-side surface of the sixth lens element id aspheric, and the image-side surface of the sixth lens element changes from concave at a paraxial region to convex at a peripheral region. When a focal length of the first lens element is f1, and a focal length of the third lens element is f3, the following relationship is satisfied:

$$0<f3/f1<2.0.$$

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
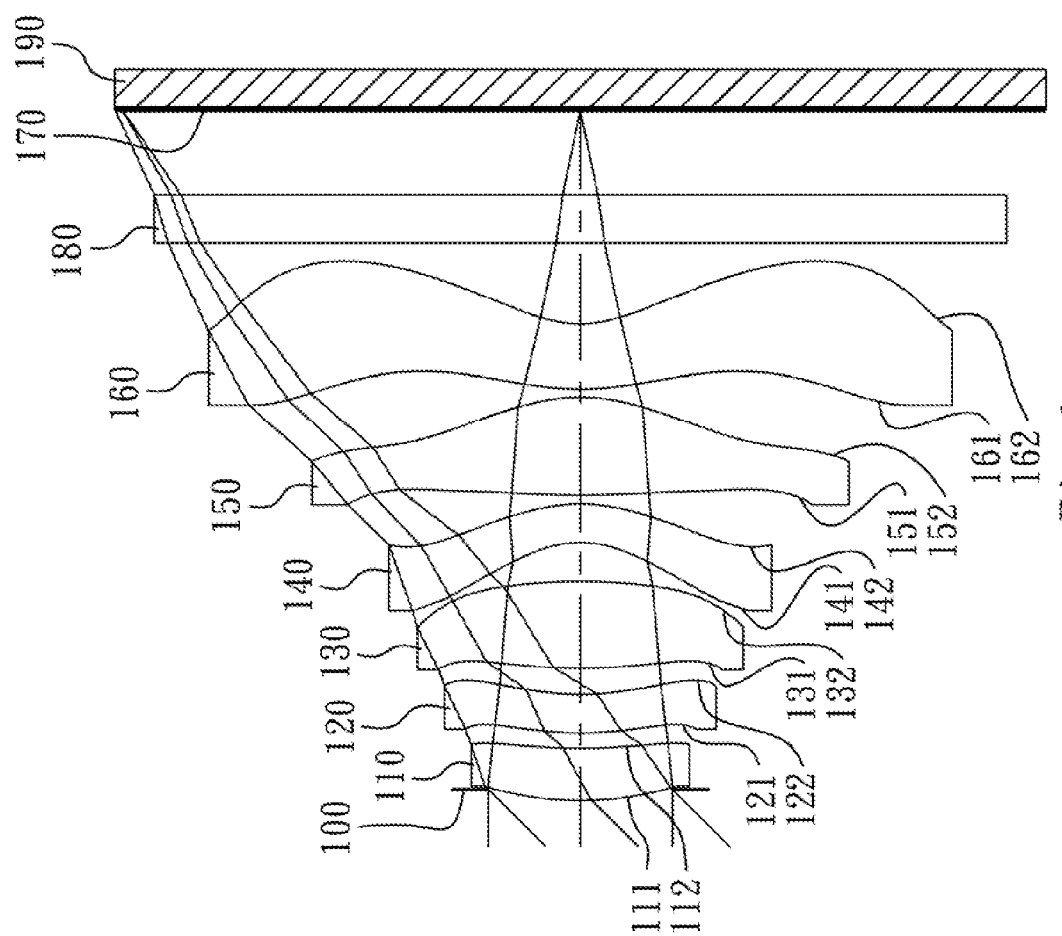
FIG. 1 is a schematic view of an optical image system according to the 1st embodiment of the present disclosure.

An optical image system includes, in order from an object side to an image side, a first lens element, a second lens element, a third lens element, a fourth lens element, a fifth lens element and a sixth lens element. The optical image system further includes an image sensor located on an image plane.

The first lens element with positive refractive power provides proper positive refractive power for the optical image system and the first lens element has a convex object-side surface can adjust the positive refractive power of the first lens element for reducing the total track length of the optical image system.

The second lens element with negative refractive power can correct the aberration generated from the first lens element with positive refractive power.

The third lens element has positive refractive power for balancing the distribution of the positive refractive power of the first lens element, so that the sensitivity of the optical image system can be reduced.

The fourth lens element with negative refractive power has a concave object-side surface and a convex image-side surface, so that the aberration and the astigmatism of the optical image system can be corrected.

The fifth lens element with positive refractive power provides main positive refractive power for the optical image system. The fifth lens element has a convex mage-side surface, so that the high order aberration of the optical image system can be corrected for enhancing the resolving power of the optical image system, then retaining the image quality.

The sixth lens element with negative refractive power has a concave image-side surface, so that the principal point of the optical image system can be positioned away from the image plane, and the total track length of the optical image system can be reduced so as to maintain the compact size of the optical image system. The image-side surface of the sixth lens element changes from concave at the paraxial region to convex at the peripheral region, so that the high order aberration of the optical image system can be corrected, and the incident angle of the off-axis field on the image sensor can be effectively reduced, and the aberration of the off-axis field can be corrected.

When a focal length of the optical image system is f, a focal length of the first lens element is f1, and a focal length of the second lens element is f2, the following relationship is satisfied:

$$0<f/f1+|f/f2|<1.35.$$

Therefore, when the second lens element has negative refractive power, the aberration generated from the first lens element can be corrected; when the second lens element has positive refractive power, the distribution of the positive refractive power of the optical image system can be balanced.

When the focal length of the first lens element is f1, and a focal length of the third lens element is f3, the following relationship is satisfied:

$$0<f3/f1<2.0.$$

Therefore, the distribution of the refractive power of the first lens element and the third lens element can reduce the sensitivity of the optical image system. Furthermore, the aberration generated from the excessive curvature of the first lens element and the third lens element can be reduced, and the spherical aberration of the optical image system can be corrected for enhancing the image quality.

f3 and f1 can further satisfy the following relationship:

$$0 < f3/f1 < 1.6.$$

When the focal length of the optical image system is f, and a curvature radius of the object-side surface of the fourth lens element is R7, the following relationship is satisfied:

$$-2.5 < R7/f < 0$$

Therefore, the aberration of the optical image system can be corrected by adjusting the curvature of the object-side surface of the fourth lens element.

R7 and f can further satisfy the following relationship:

$$-0.6 < R7/f < 0.$$

When an Abbe number of the fourth lens element is V4, and an Abbe number of the fifth lens element is V5, the following relationship is satisfied:

$$1.5 < V5/V4 < 3.0.$$

Therefore, the chromatic aberration of the optical image system can be corrected.

When the focal length of the optical image system is f, the focal length of the third lens element is f3, and a focal length of the fourth lens element is f4, the following relationship is satisfied:

$$1.0 < f/f3 + |f/f4| < 2.7.$$

Therefore, the refractive power of the third lens element and the fourth lens element are proper, so that the aberration of the optical image system can be corrected and the sensitivity of the optical image system can be reduced.

When a half of the maximal field of view of the optical image system is HFOV, the following relationship is satisfied:

$$35 \text{ degrees} < HFOV < 50 \text{ degrees}.$$

The distortion of the peripheral region of the image would be severe due to the excessive field of view, and the functional range of the captured image would be restricted due to the insufficient field of view. Therefore, the proper field of view of the optical image system can provide the proper range of the captured image while avoiding the excessive distortion.

When a sum of the central thickness from the first through sixth lens elements is ΣCT and an axial distance between the object-side surface of the first lens element and the image-side surface of the sixth lens element is TD, the following relationship is satisfied:

$$0.62 < \Sigma CT/TD < 0.88.$$

Therefore, the thickness of the lens elements are proper for increasing the fabricated yield of the optical image system, and the total track length of the optical image system can be reduced so as to maintain the compact size of the optical image system.

When an axial distance between the object-side surface of the first lens element and an image plane is TTL, and a maximum image height of the optical image system is ImgH, the following relationship is satisfied:

$$TTL/ImgH < 2.0.$$

Therefore, the optical image system with a short total track length can maintain the compact size for portable electronic products.

According to the optical image system of the present disclosure, the lens elements thereof can be made of glass or plastic material. When the lens elements are made of glass material, the distribution of the refractive power of the optical image system may be more flexible to design. When the lens elements are made of plastic material, the cost of manufacture can be effectively reduced. Furthermore, surfaces of each lens element can be aspheric, so that it is easier to make the surfaces into non-spherical shapes. As a result, more controllable variables are obtained, and the aberration is reduced, as well as the number of required lens elements can be reduced while constructing an optical system. Therefore, the total track length of the optical image system can also be reduced.

According to the optical image system of the present disclosure, when the lens element has a convex surface, it indicates that the paraxial region of the surface is convex; and when the lens element has a concave surface, it indicates that the paraxial region of the surface is concave.

According to the optical image system of the present disclosure, the optical image system can include at least one stop, such as an aperture stop, a glare stop, or a field stop, etc. Said glare stop or said field stop is allocated for reducing stray light while retaining high image quality. Furthermore, when a stop is an aperture stop, the position of the aperture stop within an optical system can be arbitrarily placed in front of the entire lens assembly, within the lens assembly, or in front of the image plane in accordance with the preference of an optical designer, in order to achieve the desirable optical features or higher image quality produced from the optical system.

According to the above description of the present disclosure, the following 1st-10th specific embodiments are provided for further explanation.

1st Embodiment

Figure 2:
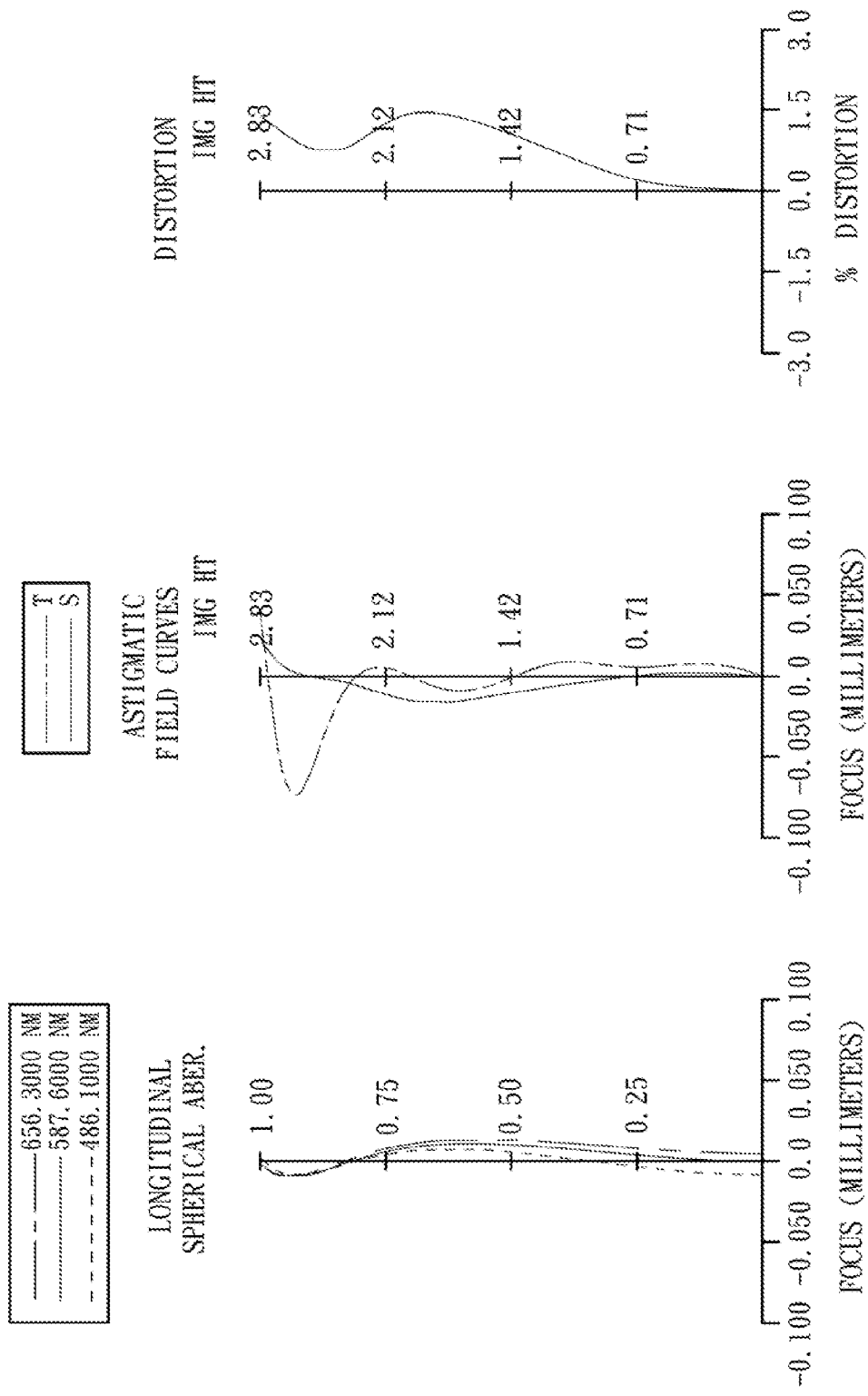
FIG. 2 shows spherical aberration curves, astigmatic field curves and a distortion curve of the optical image system according to the 1st embodiment.

FIG. 1 is a schematic view of an optical image system according to the 1st embodiment of the present disclosure. FIG. 2 shows spherical aberration curves, astigmatic field curves and a distortion curve of the optical image system according to the 1st embodiment. In FIG. 1, the optical image system includes, in order from an object side to an image side, an aperture stop 100, a first lens element 110, a second lens element 120, a third lens element 130, a fourth lens element 140, a fifth lens element 150, a sixth lens element 160, an IR-cut filter 180, an image plane 170 and an image sensor 190.

The first lens element 110 with positive refractive power has a convex object-side surface 111 and a concave image-side surface 112. The first lens element 110 is made of plastic material and has the object-side surface 111 and the image-side surface 112 being aspheric.

The second lens element 120 with negative refractive power has a convex object-side surface 121 and a concave image-side surface 122. The second lens element 120 is made of plastic material and has the object-side surface 121 and the image-side surface 122 being aspheric.

The third lens element 130 with positive refractive power has a convex object-side surface 131 and a convex image-side surface 132. The third lens element 130 is made of plastic material and has the object-side surface 131 and the image-side surface 132 being aspheric.

The fourth lens element 140 with negative refractive power has a concave object-side surface 141 and a convex image-side surface 142. The fourth lens element 140 is made of plastic material and has the object-side surface 141 and the image-side surface 142 being aspheric.

The fifth lens element 150 with positive refractive power has a convex object-side surface 151 and a convex image-side surface 152. The fifth lens element 150 is made of plastic material and has the object-side surface 151 and the image-side surface 152 being aspheric.

The sixth lens element 160 with negative refractive power has a convex object-side surface 161 and a concave image-side surface 162. The sixth lens element 160 is made of plastic material and has the object-side surface 161 and the image-side surface 162 being aspheric. Furthermore, the image-side surface 162 of the sixth lens element 160 changes from concave at the paraxial region to convex at the peripheral region.

The IR-cut filter 180 is made of glass, and located between the sixth lens element 160 and the image plane 170, and will not affect the focal length of the optical image system.

The equation of the aspheric surface profiles of the aforementioned lens elements of the 1st embodiment is expressed as follows:

$$X(Y) = (Y^2/R)/(1 + sqrt(1 - (1+k)\times(Y/R)^2)) + \sum_i (Ai)\times(Y^i),$$

wherein,

X is the distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the optical image system according to the 1st embodiment, when a focal length of the optical image system is f, an f-number of the optical image system is Fno, and half of the maximal field of view of the optical image system is HFOV, these parameters have the following values.

f=2.79 mm;
Fno=2.45; and
HFOV=45.0 degrees.

In the optical image system according to the 1st embodiment, when an Abbe number of the fourth lens element 140 is V4, and an Abbe number of the fifth lens element 150 is V5, the following relationship is satisfied:

$V5/V4=2.40$.

In the optical image system according to the 1st embodiment, when a sum of the central thickness from the first through sixth lens elements (110-160) is ΣCT, and an axial distance between the object-side surface 111 of the first lens element 110 and the image-side surface 162 of the sixth lens element 160 is TD, the following relationship is satisfied:

$\Sigma CT/TD=0.08$.

In the optical image system according to the 1st embodiment, when the focal length of the optical image system is f, and a curvature radius of the object-side surface 141 of the fourth lens element 140 is R7, the following relationship is satisfied:

$R7/f=-0.21$.

In the optical image system according to the 1st embodiment, when the focal length of the optical image system is f, a focal length of the first lens element 110 is f1, a focal length of the second lens element 120 is f2, a focal length of the third lens element 130 is f3, and a focal length of the fourth lens element 140 is f4, the following relationships are satisfied:

$|f/f1|+|f/f2|=0.45$;

$|f/f3|+|f/f4|=1.92$; and $f3/f1=0.38$.

In the optical image system according to the 1st embodiment, when an axial distance between the object-side surface 111 of the first lens element 110 and the image plane 170 is TTL and a maximum image height of the optical image system is ImgH which here is a half of the diagonal length of the photosensitive area of the image sensor 190 on the image plane 170, the following relationship is satisfied:

$TTL/ImgH=1.47$.

The detailed optical data of the 1st embodiment are shown in Table 1 and the aspheric surface data are shown in Table 2 below.

TABLE 1

| 1st Embodiment f = 2.79 mm, Fno = 2.45, HFOV = 45.0 deg. | | | | | | | |
|---|---|---|---|---|---|---|---|
| Surface # | | Curvature Radius | Thickness | Material | index | Abbe # | Focal length |
| 0 | Object | Plano | Infinity | | | | |
| 1 | Ape. Stop | Plano | −0.070 | | | | |
| 2 | Lens 1 | 1.995 (ASP) | 0.325 | Plastic | 1.544 | 55.9 | 8.13 |
| 3 | | 3.426 (ASP) | 0.092 | | | | |
| 4 | Lens 2 | 1.870 (ASP) | 0.240 | Plastic | 1.640 | 23.3 | −27.31 |
| 5 | | 1.605 (ASP) | 0.162 | | | | |
| 6 | Lens 3 | 2.913 (ASP) | 0.535 | Plastic | 1.544 | 55.9 | 3.06 |
| 7 | | −3.622 (ASP) | 0.244 | | | | |
| 8 | Lens 4 | −0.596 (ASP) | 0.240 | Plastic | 1.640 | 23.3 | −2.79 |
| 9 | | −1.036 (ASP) | 0.050 | | | | |
| 10 | Lens 5 | 4.902 (ASP) | 0.610 | Plastic | 1.544 | 55.9 | 1.62 |
| 11 | | −1.029 (ASP) | 0.050 | | | | |
| 12 | Lens 6 | 1.677 (ASP) | 0.400 | Plastic | 1.544 | 55.9 | −2.30 |
| 13 | | 0.655 (ASP) | 0.500 | | | | |
| 14 | IR-cut filter | Plano | 0.300 | Glass | 1.517 | 64.2 | — |
| 15 | | Plano | 0.529 | | | | |
| 16 | Image | Plano | — | | | | |

Note:
Reference wavelength (d-line) is 587.6 nm.

TABLE 2

Aspheric Coefficients

| Surface # | 2 | 3 | 4 | 5 | 6 | 7 |
|---|---|---|---|---|---|---|
| k = | 6.2064E−01 | −9.9561E+00 | −6.5676E+00 | −8.0737E+00 | −1.3337E+00 | −2.2546E+01 |
| A4 = | −2.9608E−03 | −1.8309E−01 | −3.2911E−01 | −1.7576E−01 | −1.4804E−01 | −3.2845E−02 |
| A6 = | 3.7665E−02 | 4.5425E−01 | 5.9504E−01 | 3.0653E−01 | −2.1157E−02 | −1.7725E−01 |
| A8 = | −4.5767E−02 | −7.7023E−01 | −8.9569E−01 | −4.2416E−01 | 7.5048E−02 | 3.6802E−02 |
| A10 = | −4.9839E−01 | −7.9717E−01 | −2.7979E−01 | 1.5299E−03 | −1.4045E−01 | −1.0044E−02 |
| A12 = | 2.0282E+00 | 6.6948E−01 | 1.4441E−02 | −2.9656E−01 | −1.6712E−01 | −1.1397E−02 |
| A14 = | −3.6199E+00 | −3.4242E−01 | −1.9141E+00 | 1.2347E−01 | 2.1664E−02 | 2.6843E−02 |

| Surface # | 8 | 9 | 10 | 11 | 12 | 13 |
|---|---|---|---|---|---|---|
| k = | −2.1428E+00 | −3.2913E+00 | −2.2625E−01 | −6.4754E+00 | −1.0636E+01 | −4.3436E+00 |
| A4 = | 3.8140E−01 | 1.5773E−01 | −1.7199E−01 | −3.4326E−02 | −1.1205E−01 | −8.8015E−02 |
| A6 = | −8.5520E−01 | −2.6508E−01 | 1.8244E−01 | 5.4860E−03 | 3.2206E−02 | 2.8413E−02 |
| A8 = | 1.1576E+00 | 3.3332E−01 | −9.1689E−02 | 1.0442E−01 | −5.7945E−03 | −6.9472E−03 |
| A10 = | −9.1411E−01 | −2.3855E−01 | 1.2349E−02 | −8.6537E−02 | 4.1627E−04 | 1.0070E−03 |
| A12 = | 5.9578E−01 | 1.3300E−01 | 6.7585E−04 | 2.5923E−02 | 1.2805E−04 | −1.3520E−04 |
| A14 = | −2.2679E−01 | −3.6577E−02 | 5.7344E−05 | −2.7594E−03 | −2.0075E−05 | 1.1780E−05 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

2nd Embodiment

Figure 3:
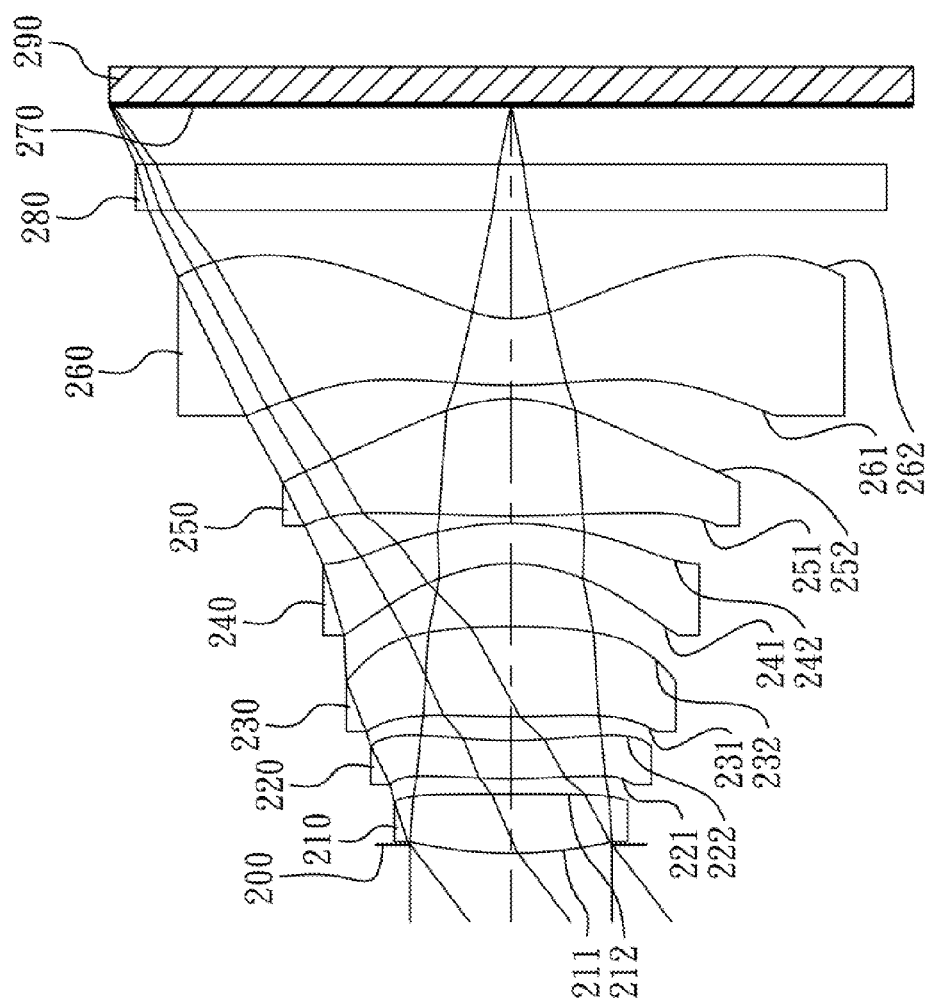
FIG. 3 is a schematic view of an optical image system according to the 2nd embodiment of the present disclosure.
Figure 4:
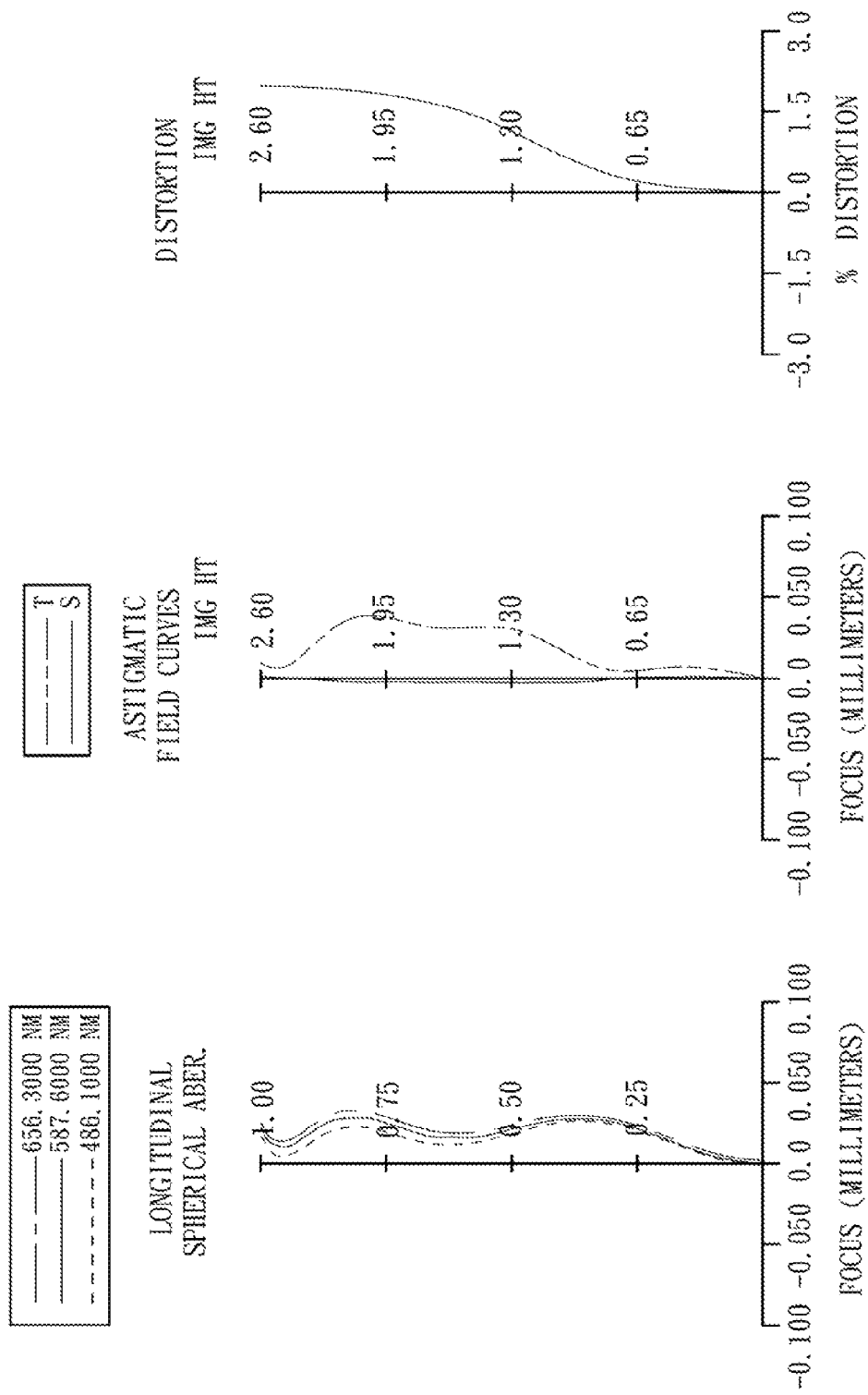
FIG. 4 shows spherical aberration curves, astigmatic field curves and a distortion curve of the optical image system according to the 2nd embodiment.

FIG. 3 is a schematic view of an optical image system according to the 2nd embodiment of the present disclosure. FIG. 4 shows spherical aberration curves, astigmatic field curves and a distortion curve of the optical image system according to the 2nd embodiment. In FIG. 3, the optical image system includes, in order from an object side to an image side, an aperture stop 200, a first lens element 210, a second lens element 220, a third lens element 230, a fourth lens element 240, a fifth lens element 250, a sixth lens element 260, an IR-cut filter 280, an image plane 270 and an image sensor 290.

The first lens element 210 with positive refractive power has a convex object-side surface 211 and a convex image-side surface 212. The first lens element 210 is made of plastic material and has the object-side surface 211 and the image-side surface 212 being aspheric.

The second lens element 220 with negative refractive power has a convex object-side surface 221 and a concave image-side surface 222. The second lens element 220 is made of plastic material and has the object-side surface 221 and the image-side surface 222 being aspheric.

The third lens element 230 with positive refractive power has a convex object-side surface 231 and a convex image-side surface 232. The third lens element 230 is made of plastic material and has the object-side surface 231 and the image-side surface 232 being aspheric.

The fourth lens element 240 with negative refractive power has a concave object-side surface 241 and a convex image-side surface 242. The fourth lens element 240 is made of plastic material and has the object-side surface 241 and the image-side surface 242 being aspheric.

The fifth lens element 250 with positive refractive power has a convex object-side surface 251 and a convex image-side surface 252. The fifth lens element 250 is made of plastic material and has the object-side surface 251 and the image-side surface 252 being aspheric.

The sixth lens element 260 with negative refractive power has a convex object-side surface 261 and a concave image-side surface 262. The sixth lens element 260 is made of plastic material and has the object-side surface 261 and the image-side surface 262 being aspheric. Furthermore, the image-side surface 262 of the sixth lens element 260 changes from concave at the paraxial region to convex at the peripheral region.

The IR-cut filter 280 is made of glass, and located between the sixth lens element 260 and the image plane 270, and will not affect the focal length of the optical image system.

The detailed optical data of the 2nd embodiment are shown in Table 3 and the aspheric surface data are shown in Table 4 below.

TABLE 3

2nd Embodiment
f = 3.27 mm, Fno = 2.50, HFOV = 37.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.055 | | | | |
| 2 | Lens 1 | 2.839 (ASP) | 0.384 | Plastic | 1.544 | 55.9 | 4.84 |
| 3 | | −34.904 (ASP) | 0.100 | | | | |
| 4 | Lens 2 | 5.049 (ASP) | 0.251 | Plastic | 1.640 | 23.3 | −11.12 |
| 5 | | 2.895 (ASP) | 0.154 | | | | |
| 6 | Lens 3 | 6.193 (ASP) | 0.585 | Plastic | 1.544 | 55.9 | 5.17 |
| 7 | | −4.975 (ASP) | 0.405 | | | | |

TABLE 3-continued

2nd Embodiment
f = 3.27 mm, Fno = 2.50, HFOV = 37.8 deg.

| Surface # | | Curvature Radius | Thickness | Material | Index | Abbe # | Focal length |
|---|---|---|---|---|---|---|---|
| 8 | Lens 4 | −0.978 (ASP) | 0.261 | Plastic | 1.640 | 23.3 | −3.80 |
| 9 | | −1.805 (ASP) | 0.050 | | | | |
| 10 | Lens 5 | 5.501 (ASP) | 0.761 | Plastic | 1.544 | 55.9 | 1.51 |
| 11 | | −0.921 (ASP) | 0.088 | | | | |
| 12 | Lens 6 | 3.447 (ASP) | 0.430 | Plastic | 1.544 | 55.9 | −1.68 |
| 13 | | 0.689 (ASP) | 0.700 | | | | |
| 14 | IR-cut filter | Plano | 0.300 | Glass | 1.517 | 64.2 | — |
| 15 | | Plano | 0.385 | | | | |
| 16 | Image | Plano | — | | | | |

Note:
Reference wavelength (d-line) is 587.6 nm.

TABLE 4

Aspheric Coefficients

| Surface | 2 | 3 | 4 | 5 | 6 | 7 |
|---|---|---|---|---|---|---|
| k = | −4.6131E+00 | 1.0000E+00 | −1.4529E+00 | −1.1402E+00 | 9.1498E−01 | 1.0000E+00 |
| A4 = | −5.1346E−03 | −4.1140E−02 | −2.2182E−01 | −2.9462E−01 | −1.9115E−01 | −5.7057E−02 |
| A6 = | 2.1835E−01 | 1.4079E−02 | 5.2109E−01 | 2.9669E−01 | −3.8366E−02 | −1.5618E−01 |
| A8 = | −8.9151E−01 | 2.0928E−01 | −1.2685E+00 | −2.6672E−01 | 9.7293E−02 | 4.1068E−02 |
| A10 = | 7.6028E−01 | −1.1346E+00 | 1.2051E+00 | 8.6264E−02 | −9.8800E−02 | −1.6683E−02 |
| A12 = | 2.0819E+00 | 6.8377E−01 | 2.0388E−02 | −2.7060E−01 | −1.0843E−01 | −4.2395E−03 |
| A14 = | −3.6132E+00 | −2.4595E−01 | −1.8529E+00 | 1.2493E−01 | 1.2559E−01 | 1.4445E−02 |

| Surface # | 8 | 9 | 10 | 11 | 12 | 13 |
|---|---|---|---|---|---|---|
| k = | −1.5933E+00 | −2.8576E+00 | −2.4883E+00 | −5.3171E+00 | −2.0000E+01 | −4.4562E+00 |
| A4 = | 3.5216E−01 | 1.1951E−01 | −1.6304E−01 | −4.9893E−02 | −1.2101E−01 | −7.7847E−02 |
| A6 = | −8.9238E−01 | −2.8261E−01 | 1.7002E−01 | −8.7973E−02 | 3.6759E−42 | 2.6008E−02 |
| A8 = | 1.1122E+00 | 3.2869E−01 | −9.5172E−02 | 1.0410E−01 | −6.7267E−03 | −6.8669E−03 |
| A10 = | −9.4430E−01 | −2.4349E−01 | 1.5033E−02 | −8.5626E−02 | 5.1874E−04 | 1.1516E−03 |
| A12 = | 5.9484E−01 | 1.3300E−01 | 1.1006E−03 | 2.6126E−02 | 1.4360E−04 | −1.1549E−04 |
| A14 = | −1.7905E−01 | −3.2710E−02 | −2.4562E−04 | −2.6663E−03 | −2.4339E−05 | 5.0679E−06 |

In the optical image system according to the 2nd embodiment, the definitions of f, Fno, HFOV, V4, V5, ΣCT, TD, R7, f1, f2, f3, f4, TTL and ImgH are the same as those stated in the 1st embodiment with corresponding values for the 2nd embodiment. Moreover, these parameters can be calculated from Table 3 and Table 4 as the following values and satisfy the following relationships:

| f (mm) | 3.27 | R7/f | −0.30 |
| Fno | 2.50 | f/f1 + |f/f2| | 0.97 |
| HFOV (deg.) | 37.8 | f/f3 + |f/f4| | 1.49 |
| V5/V4 | 2.40 | f3/f1 | 1.07 |
| Σ CT/TD | 0.77 | TTL/ImgH | 1.83 |

3rd Embodiment

Figure 5:
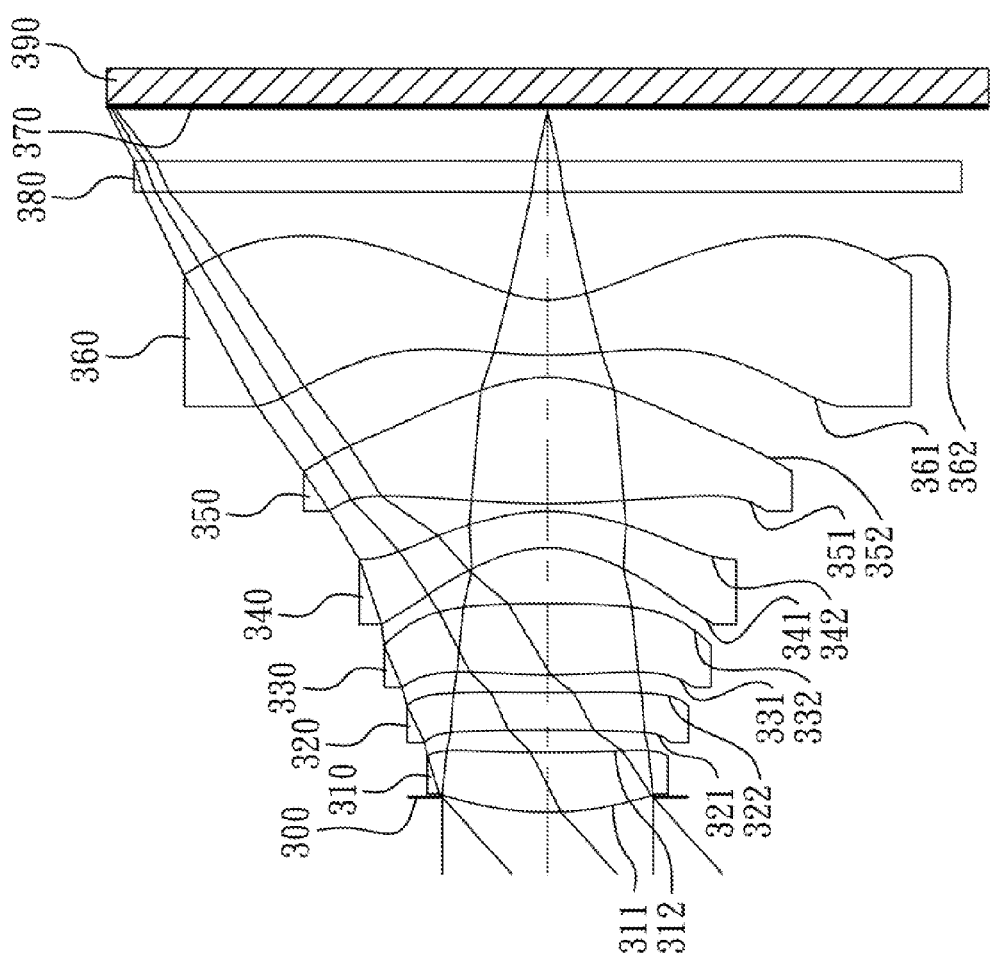
FIG. 5 is a schematic view of an optical image system according to the 3rd embodiment of the present disclosure.
Figure 6:
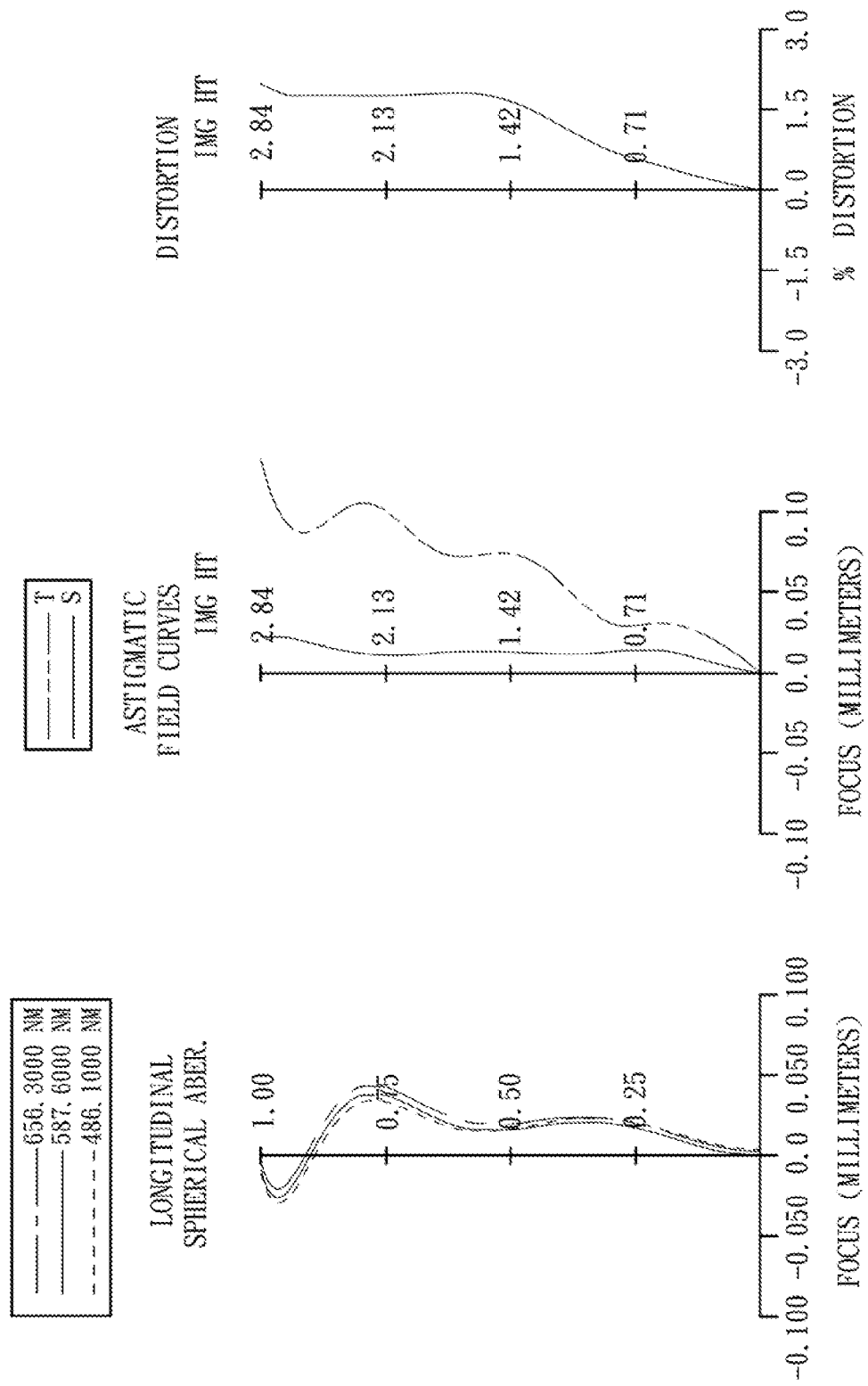
FIG. 6 shows spherical aberration curves, astigmatic field curves and a distortion curve of the optical image system according to the 3rd embodiment.

FIG. 5 is a schematic view of an optical image system according to the 3rd embodiment of the present disclosure FIG. 6 shows spherical aberration curves, astigmatic field curves and a distortion curve of the optical image system according to the 3rd embodiment. In FIG. 5, the optical image system includes, in order from an object side to an mage side, an aperture stop 300, a first lens element 310, a second lens element 320, a third lens element 330, a fourth lens element 340, a fifth lens element 350, a sixth lens element 360, an IR-cut filter 380, an image plane 370 and an image sensor 390.

The first lens element 310 with positive refractive power has a convex object-side surface 311 and a concave image-side surface 312. The first lens element 310 is made of plastic material and has the object-side surface 311 and the image-side surface 312 being aspheric.

The second lens element 320 with negative refractive power has a concave object-side surface 321 and a concave image-side surface 322. The second lens element 320 is made of plastic material and has the object-side surface 321 and the image-side surface 322 being aspheric.

The third lens element 330 with positive refractive power has a convex object-side surface 331 and a convex image-side surface 332. The third lens element 330 is made of plastic material and has the object-side surface 331 and the image-side surface 332 being aspheric.

The fourth lens element 340 with negative refractive power has a concave object-side surface 341 and a convex image-side surface 342. The fourth lens element 340 is made of plastic material and has the object-side surface 341 and the image-side surface 342 being aspheric.

The fifth lens element 350 with positive refractive power has a convex object-side surface 351 and a convex image-side surface 352. The fifth lens element 350 is made of plastic material and has the object-side surface 351 and the image-side surface 352 being aspheric.

The sixth lens element 360 with negative refractive power has a convex object-side surface 361 and a concave image-side surface 362. The sixth lens element 360 is made of plastic material and has the object-side surface 361 and the image-side surface 362 being aspheric. Furthermore, the image-side surface 362 of the sixth lens element 360 changes from concave at the paraxial region to convex at the peripheral region.

The IR-cut filter 380 is made of glass, and located between the sixth lens element 360 and the image plane 370, and will not affect the focal length of the optical image system.

The detailed optical data of the 3rd embodiment are shown in Table 5 and the aspheric surface data are shown in Table 6 below

| f (mm) | 3.07 | R7/f | −0.25 |
|---|---|---|---|
| Fno | 2.25 | f/f1 + |f/f2| | 0.90 |
| HFOV (deg.) | 42.0 | f/f3 + |f/f4| | 1.48 |
| V5/V4 | 2.63 | f3/f1 | 1.02 |
| ΣCT/TD | 0.76 | TTL/ImgH | 1.59 |

TABLE 5

3rd Embodiment
f = 3.07 mm, Fno = 2.25, HFOV = 42.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.097 | | | | |
| 2 | Lens 1 | 2.044 (ASP) | 0.391 | Plastic | 1.544 | 55.9 | 4.78 |
| 3 | | 8.896 (ASP) | 0.144 | | | | |
| 4 | Lens 2 | −40.716 (ASP) | 0.240 | Plastic | 1.650 | 21.4 | −12.14 |
| 5 | | 9.801 (ASP) | 0.115 | | | | |
| 6 | Lens 3 | 3.745 (ASP) | 0.466 | Plastic | 1.544 | 55.9 | 4.87 |
| 7 | | −8.681 (ASP) | 0.358 | | | | |
| 8 | Lens 4 | −0.764 (ASP) | 0.240 | Plastic | 1.650 | 21.4 | −3.61 |
| 9 | | −1.272 (ASP) | 0.050 | | | | |
| 10 | Lens 5 | 4.231 (ASP) | 0.820 | Plastic | 1.535 | 56.3 | 1.55 |
| 11 | | −0.957 (ASP) | 0.141 | | | | |
| 12 | Lens 6 | 2.850 (ASP) | 0.359 | Plastic | 1.535 | 56.3 | −1.77 |
| 13 | | 0.678 (ASP) | 0.700 | | | | |
| 14 | IR-cut filter | Plano | 0.200 | Glass | 1.517 | 64.2 | — |
| 15 | | Plano | 0.353 | | | | |
| 16 | Image | Plano | — | | | | |

Note:
Reference wavelength (d-line) is 587.6 nm.

TABLE 6

Aspheric Coefficients

| | Surface # | | | | | |
|---|---|---|---|---|---|---|
| | 2 | 3 | 4 | 5 | 6 | 7 |
| k = | −2.3248E+00 | −7.1896E−01 | −1.0000E+00 | −1.0000E+00 | −2.9829E+01 | −8.9756E−02 |
| A4 = | 5.2927E−03 | −6.3827E−02 | −1.5463E−01 | −2.5645E−01 | −1.7796E−01 | −2.5449E−02 |
| A6 = | 2.1309E−01 | 4.3596E−02 | 5.5086E−01 | 3.8028E−01 | 8.9247E−04 | −1.7415E−01 |
| A8 = | −9.8985E−01 | 3.0858E−01 | −1.1478E+00 | −2.4809E−01 | 8.4462E−02 | 4.2580E−02 |
| A10 = | 1.0093E+00 | −1.2847E+00 | 1.0977E+00 | 2.8530E−02 | −1.4847E−01 | −2.8959E−03 |
| A12 = | 2.0282E+00 | 6.6948E−01 | 1.4439E−02 | −2.7697E−01 | −1.1046E−01 | −1.0789E−03 |
| A14 = | −3.6199E+00 | −3.4242E−01 | −1.9141E+00 | 1.1117E−01 | 1.2588E−01 | 2.1627E−03 |

| | Surface # | | | | | |
|---|---|---|---|---|---|---|
| | 8 | 9 | 10 | 11 | 12 | 13 |
| k = | −1.7363E+00 | −2.9026E+00 | −8.0800E−01 | −5.7893E+00 | −3.0000E+01 | −4.3731E+00 |
| A4 = | 3.5816E−01 | 1.3220E−01 | −1.6181E−01 | −6.7853E−02 | −1.2481E−01 | −7.7240E−02 |
| A6 = | −8.8064E−01 | −2.7580E−01 | 1.7030E−01 | −8.8065E−04 | 3.3720E−02 | 2.3724E−02 |
| A8 = | 1.1289E+00 | 3.2915E−01 | −9.2404E−02 | 1.0513E−01 | −6.1272E−03 | −6.1096E−03 |
| A10 = | −9.2844E−01 | −2.4342E−01 | 1.4996E−02 | −8.6056E−02 | 5.6024E−04 | 1.1147E−03 |
| A12 = | 5.9843E−01 | 1.3126E−01 | 8.2524E−04 | 2.5943E−02 | 1.8549E−04 | −1.3024E−04 |
| A14 = | −1.9897E−01 | −3.2310E−02 | −4.4294E−04 | −2.7224E−03 | −3.5109E−05 | 6.9135E−06 |

In the optical image system according to the 3rd embodiment, the definitions of f, Fno, HFOV, V4, V5, ΣCT, TD, R7, f1, f2, f3, f4, TTL and ImgH are the same as those stated in the 1st embodiment with corresponding values for the 3rd embodiment. Moreover, these parameters can be calculated from Table 5 and Table 6 as the following values and satisfy the following relationships:

4th Embodiment

Figure 7:
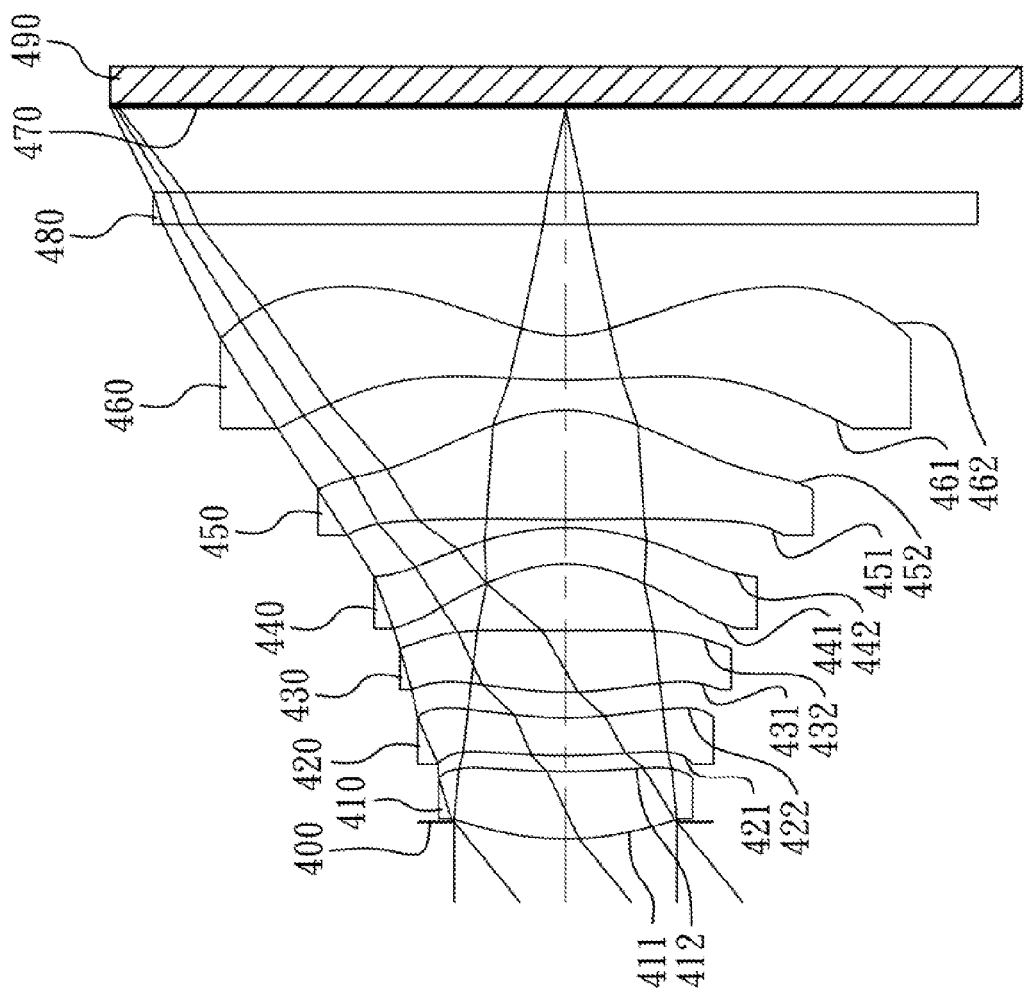
FIG. 7 is a schematic view of an optical image system according to the 4th embodiment of the present disclosure.
Figure 8:
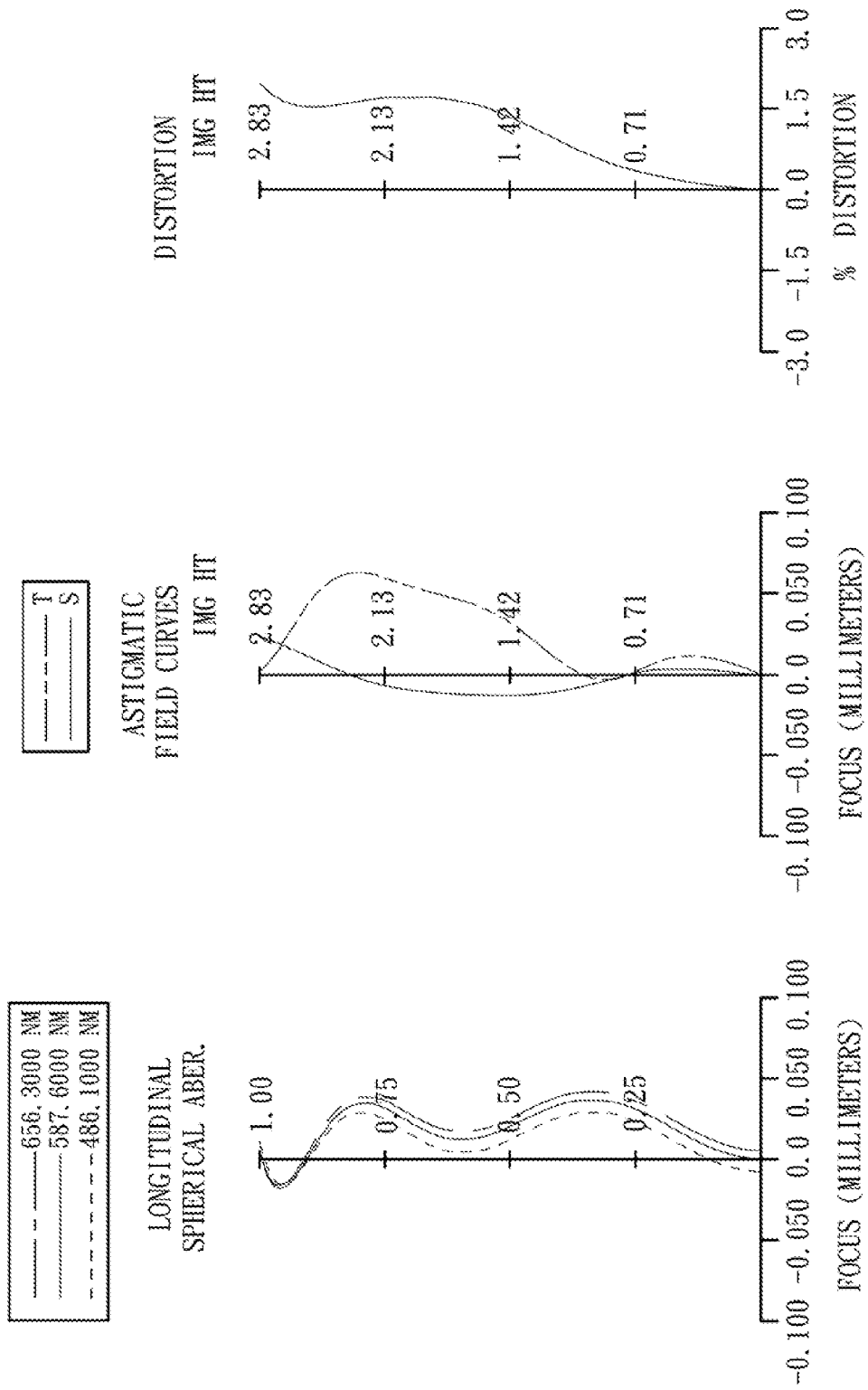
FIG. 8 shows spherical aberration curves, astigmatic field curves and a distortion curve of the optical image system according to the 4th embodiment.

FIG. 7 is a schematic view of an optical image system according to the 4th embodiment of the present disclosure. FIG. 8 shows spherical aberration curves, astigmatic field curves and a distortion curve of the optical image system according to the 4th embodiment. In FIG. 7, the optical image system includes, in order from an object side to an image side, an aperture stop 400, a first lens element 410, a second lens element 420, a third lens element 430, a fourth lens element 440, a fifth lens element 450, a sixth lens element 460 an IR-cut filter 480, an image plane 470 and an image sensor 490.

The first lens element 410 with positive refractive power has a convex object-side surface 411 and a concave image-side surface 412. The first lens element 410 is made of plastic material and has the object-side surface 411 and the image-side surface 412 being aspheric.

The second lens element 420 with negative refractive power has a convex object-side surface 421 and a concave image-side surface 422. The second lens element 420 is made of plastic material and has the object-side surface 421 and the image-side surface 422 being aspheric.

The third lens element 430 with positive refractive power has a convex object-side surface 431 and a concave image-side surface 432. The third lens element 430 is made of plastic material and has the object-side surface 431 and the image-side surface 432 being aspheric.

The fourth lens element 440 with negative refractive power has a concave object-side surface 441 and a convex image-side surface 442. The fourth lens element 440 is made of plastic material and has the object-side surface 441 and the image-side surface 442 being aspheric.

The fifth lens element 450 with positive refractive power has a convex object-side surface 451 and a convex image-side surface 452. The fifth lens element 450 is made of plastic material and has the object-side surface 451 and the image-side surface 452 being aspheric.

The sixth lens element 460 with negative refractive power has a convex object-side surface 461 and a concave image-side surface 462. The sixth lens element 460 is made of plastic material and has the object-side surface 461 and the image-side surface 462 being aspheric. Furthermore, the image-side surface 462 of the sixth lens element 460 changes from concave at the paraxial region to convex at the peripheral region.

The IR-cut filter 480 is made of glass, and located between the sixth lens element 460 and the image plane 470, and will not affect the focal length of the optical image system.

The detailed optical data of the 4th embodiment are shown in Table 7 and the aspheric surface data are shown in Table 8 below.

TABLE 7

4th Embodiment
f = 3.36 mm, Fno = 2.40, HFOV = 39.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.104 | | | | |
| 2 | Lens 1 | 1.933 (ASP) | 0.426 | Plastic | 1.544 | 55.9 | 6.08 |
| 3 | | 4.287 (ASP) | 0.100 | | | | |
| 4 | Lens 2 | 3.602 (ASP) | 0.234 | Plastic | 1.633 | 23.4 | −10.52 |
| 5 | | 2.278 (ASP) | 0.162 | | | | |
| 6 | Lens 3 | 2.206 (ASP) | 0.391 | Plastic | 1.544 | 55.9 | 4.34 |
| 7 | | 31.367 (ASP) | 0.414 | | | | |
| 8 | Lens 4 | −0.872 (ASP) | 0.232 | Plastic | 1.633 | 23.4 | −4.59 |
| 9 | | −1.375 (ASP) | 0.050 | | | | |
| 10 | Lens 5 | 10.910 (ASP) | 0.687 | Plastic | 1.544 | 55.9 | 1.54 |
| 11 | | −0.884 (ASP) | 0.191 | | | | |
| 12 | Lens 6 | 4.600 (ASP) | 0.276 | Plastic | 1.544 | 55.9 | −1.71 |
| 13 | | 0.757 (ASP) | 0.700 | | | | |
| 14 | IR-cut filter | Plano | 0.200 | Glass | 1.517 | 64.2 | — |
| 15 | | Plano | 0.544 | | | | |
| 16 | Image | Plano | — | | | | |

Note:
Reference wavelength (d-line) is 587.6 nm.

TABLE 8

Aspheric Coefficients

| Surface # | | | | | |
|---|---|---|---|---|---|
| 2 | 3 | 4 | 5 | 6 | 7 |

| | 2 | 3 | 4 | 5 | 6 | 7 |
|---|---|---|---|---|---|---|
| k = | −2.9921E+00 | −8.2573E+00 | −1.9116E+01 | −5.7747E+00 | −2.6741E+00 | −1.0000E+00 |
| A4 = | 5.2627E−03 | −8.1698E−02 | −2.1639E−01 | −2.6578E−01 | −1.6983E−01 | −1.2392E−02 |
| A6 = | 3.2472E−01 | −1.5394E−01 | 4.7170E−01 | 3.8804E−01 | −4.8016E−02 | −1.8238E−01 |
| A8 = | −1.3632E+00 | 3.9719E−01 | −1.2244E+00 | −3.1728E−01 | 1.1718E−01 | 3.8981E−02 |
| A10 = | 1.3266E+00 | −1.2773E+00 | 1.1559E+00 | 8.4893E−02 | −1.2437E−01 | 8.0491E−03 |
| A12 = | 2.0282E+00 | 6.6948E−01 | 1.4439E−02 | −2.7697E−01 | −1.1046E−01 | 2.9757E−02 |
| A14 = | −3.6199E+00 | −3.4242E−01 | −1.9141E+00 | 1.1117E−01 | 1.2588E−01 | 2.1626E−03 |

| Surface # | | | | | |
|---|---|---|---|---|---|
| 8 | 9 | 10 | 11 | 12 | 13 |

| | 8 | 9 | 10 | 11 | 12 | 13 |
|---|---|---|---|---|---|---|
| k = | −1.5955E+00 | −2.4668E+00 | −3.0000E+01 | −5.2769E+00 | −1.0907E+01 | −5.3360E+00 |
| A4 = | 3.6797E−01 | 1.2521E−01 | −1.4944E−01 | −5.8222E−02 | −1.2983E−01 | −8.5930E−02 |
| A6 = | −8.6085E−01 | −2.7396E−01 | 1.7878E−01 | 1.9466E−03 | 3.5852E−02 | 2.5299E−02 |
| A8 = | 1.1386E+00 | 3.3339E−01 | −9.5473E−02 | 1.0837E−01 | −5.9786E−03 | −6.3028E−03 |

TABLE 8-continued

| Aspheric Coefficients | | | | | | |
|---|---|---|---|---|---|---|
| A10 = | −9.2466E−01 | −2.4179E−01 | 1.4553E−02 | −8.5163E−02 | 5.3077E−04 | 1.0548E−03 |
| A12 = | 5.9783E−01 | 1.2969E−01 | 1.1462E−03 | 2.5813E−02 | 1.8975E−04 | −1.3106E−04 |
| A14 = | −2.0243E−01 | −3.2535E−02 | −4.5306E−04 | −2.9818E−03 | −4.8984E−05 | 8.7158E−06 |

In the optical image system according to the 4th embodiment, the definitions of f, Fno, HFOV, V4, V5, ΣCT, TD, R7, f1, f2, f3, f4, TTL and ImgH are the same as those stated in the 1st embodiment with corresponding values for the 4th embodiment. Moreover, these parameters can be calculated from Table 7 and Table 8 as the following values and satisfy the following relationships:

| f (mm) | 3.36 | R7/f | −0.26 |
|---|---|---|---|
| Fno | 2.40 | f/f1 + \|f/f2\| | 0.87 |
| HFOV (deg.) | 39.5 | f/f3 + \|f/f4\| | 1.51 |
| V5/V4 | 2.39 | f3/f1 | 0.71 |
| Σ CT/TD | 0.71 | TTL/ImgH | 1.60 |

5th Embodiment

Figure 9:
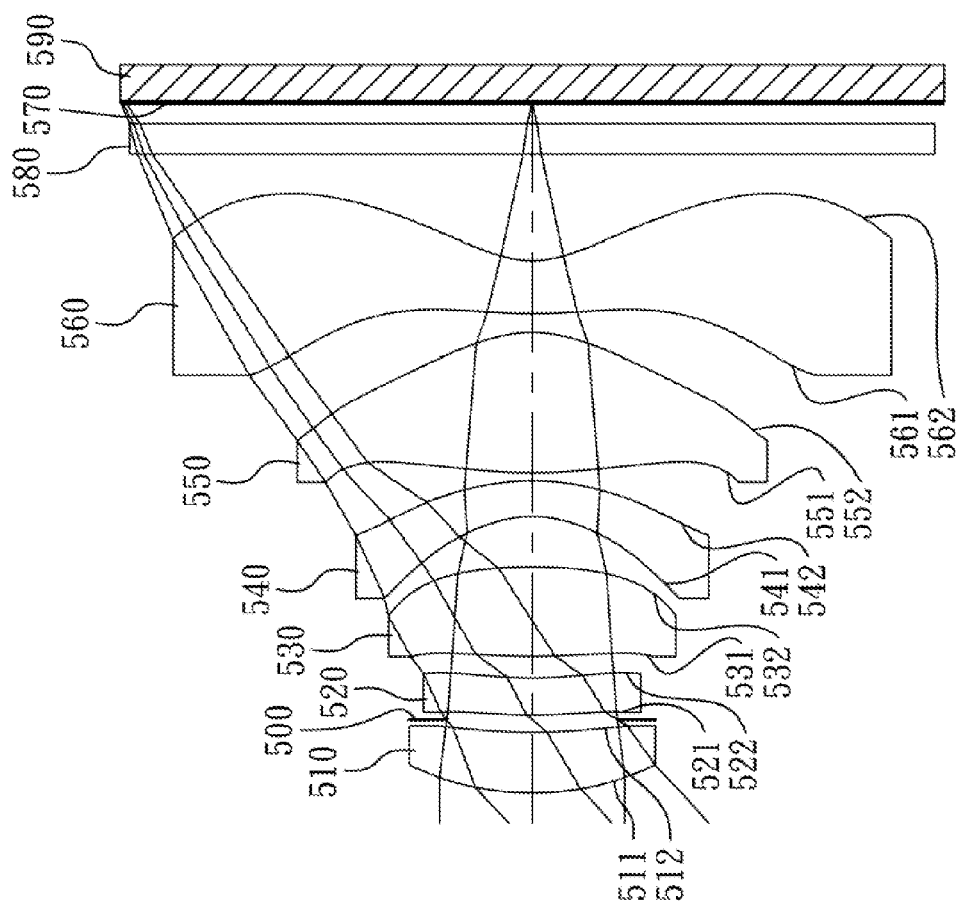
FIG. 9 is a schematic view of an optical image system according to the 5th embodiment of the present disclosure.
Figure 10:
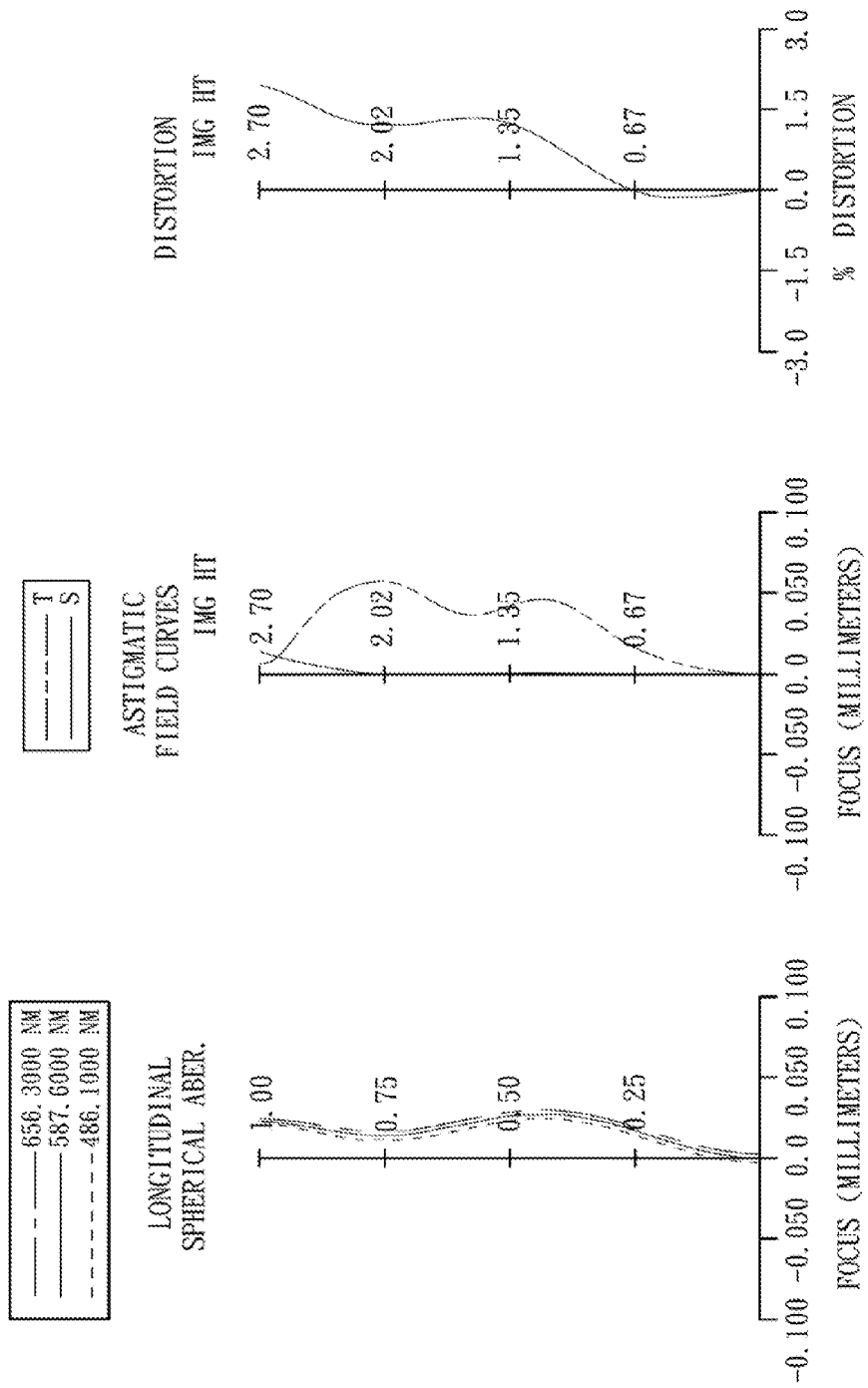
FIG. 10 shows spherical aberration curves, astigmatic field curves and a distortion curve of the optical image system according to the 5th embodiment.

FIG. 9 is a schematic view of an optical image system according to the 5th embodiment of the present disclosure. FIG. 10 shows spherical aberration curves, astigmatic field curves and a distortion curve of the optical image system according to the 5th embodiment. In FIG. 9, the optical image system includes, in order from an object side to an image side, a first lens element 510, an aperture stop 500, a second lens element 520, a third lens element 530, a fourth lens element 540, a fifth lens element 550, a sixth lens element 560, an IR-cut filter 580, an image plane 570 and an image sensor 590.

The first lens element 510 with positive refractive power has a convex object-side surface 511 and a concave image-side surface 512. The first lens element 510 is made of plastic material and has the object-side surface 511 and the image-side surface 512 being aspheric.

The second lens element 520 with negative refractive power has a convex object-side surface 521 and a concave image-side surface 522. The second lens element 520 is made of plastic material and has the object-side surface 521 and the image-side surface 522 being aspheric.

The third lens element 530 with positive refractive power has a convex object-side surface 531 and a convex image-side surface 532. The third lens element 530 is made of plastic material and has the object-side surface 531 and the image-side surface 532 being aspheric.

The fourth lens element 540 with negative refractive power has a concave object-side surface 541 and a convex image-side surface 542. The fourth lens element 540 is made of plastic material and has the object-side surface 541 and the image-side surface 542 being aspheric.

The fifth lens element 550 with positive refractive power has a convex object-side surface 551 and a convex image-side surface 552. The fifth lens element 550 is made of plastic material and has the object-side surface 551 and the image-side surface 552 being aspheric.

The sixth lens element 560 with negative refractive power has a convex object-side surface 561 and a concave image-side surface 562. The sixth lens element 560 is made of plastic material and has the object-side surface 561 and the image-side surface 562 being aspheric. Furthermore, the image-side surface 562 of the sixth lens element 560 changes from concave at the paraxial region to convex at the peripheral region.

The IR-cut filter 580 is made of glass, and located between the sixth lens element 560 and the image plane 570, and will not affect the focal length of the optical image system.

The detailed optical data of the 5th embodiment are shown in Table 9 and the aspheric surface data are shown in Table 10 below.

TABLE 9

5th Embodiment
f = 2.83 mm, Fno = 2.32, HFOV = 43.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.997 (ASP) | 0.402 | Plastic | 1.544 | 55.9 | 6.60 |
| 2 | | 4.184 (ASP) | 0.082 | | | | |
| 3 | Ape. Stop | Plano | 0.032 | | | | |
| 4 | Lens 2 | 3.671 (ASP) | 0.240 | Plastic | 1.640 | 23.3 | −16.99 |
| 5 | | 2.674 (ASP) | 0.143 | | | | |
| 6 | Lens 3 | 4.319 (ASP) | 0.588 | Plastic | 1.544 | 55.9 | 3.49 |
| 7 | | −3.222 (ASP) | 0.332 | | | | |
| 8 | Lens 4 | −0.782 (ASP) | 0.240 | Plastic | 1.640 | 23.3 | −2.86 |
| 9 | | −1.531 (ASP) | 0.050 | | | | |
| 10 | Lens 5 | 3.200 (ASP) | 0.924 | Plastic | 1.544 | 55.9 | 1.28 |
| 11 | | −0.799 (ASP) | 0.124 | | | | |
| 12 | Lens 6 | 3.726 (ASP) | 0.350 | Plastic | 1.544 | 55.9 | −1.38 |
| 13 | | 0.603 (ASP) | 0.700 | | | | |
| 14 | IR-cut filter | Plano | 0.200 | Glass | 1.517 | 64.2 | — |
| 15 | | Plano | 0.141 | | | | |
| 16 | Image | Plano | — | | | | |

Note:
Reference wavelength (d-line) is 587.6 nm.

TABLE 10

Aspheric Coefficients

| Surface # | 1 | 2 | 4 | 5 | 6 | 7 |
|---|---|---|---|---|---|---|
| k = | −1.5773E+00 | −3.1540E+00 | −1.0000E+00 | −1.0000E+00 | −1.5363E+01 | 2.9818E+00 |
| A4 = | 1.9118E−02 | −1.1098E−02 | −2.8111E−01 | −3.3544E−01 | −1.5588E−01 | −7.9314E−02 |
| A6 = | 2.6043E−01 | 3.4045E−02 | 4.8158E−01 | 3.9896E−01 | 4.6843E−02 | −1.2746E−01 |
| A8 = | −5.7266E−01 | 4.4670E−01 | −1.0480E+00 | −3.5568E−01 | 4.4076E−02 | 1.7528E−02 |
| A10 = | 2.6291E−01 | −1.8677E+00 | 2.6168E−01 | −6.6087E−01 | −2.4826E−01 | −2.4544E−02 |
| A12 = | 9.5445E−01 | 6.6948E−01 | 1.4432E−02 | 6.9966E−01 | −1.0910E−01 | −2.7702E−03 |
| A14 = | −1.1810E+00 | −3.4243E−01 | −1.9141E+00 | 1.1117E−01 | 2.0917E−01 | −2.0349E−02 |

| Surface # | 8 | 9 | 10 | 11 | 12 | 13 |
|---|---|---|---|---|---|---|
| k = | −1.2769E+00 | −2.0363E+00 | 2.4292E−01 | −5.0816E+00 | −2.8514E+01 | −4.4447E+00 |
| A4 = | 3.1356E−01 | 1.0821E−01 | −1.6450E−01 | −4.0682E−02 | −1.4083E−01 | −7.2183E−02 |
| A6 = | −9.0072E−01 | −2.8896E−01 | 1.5187E−01 | −1.7131E−02 | 3.6818E−02 | 2.2965E−02 |
| A8 = | 1.1181E+00 | 3.2585E−01 | −9.4156E−02 | 1.0176E−01 | −6.0922E−03 | −6.3101E−03 |
| A10 = | −9.3951E−01 | −2.4273E−01 | 1.5424E−02 | −8.6303E−02 | 5.6540E−04 | 1.1306E−03 |
| A12 = | 5.9864E−01 | 1.3237E−01 | 6.1608E−04 | 2.6141E−02 | 1.8511E−04 | −1.2302E−04 |
| A14 = | −1.7233E−01 | −3.1313E−02 | −2.8302E−04 | −2.5048E−03 | −3.5519E−05 | 5.9751E−06 |

In the optical image system according to the 5th embodiment, the definitions of f, Fno, HFOV, V4, V5, ACT, TD, R7, f1, f2, f3, f4, TTL and ImgH are the same as those stated in the 1st embodiment with corresponding values for the 5th embodiment. Moreover, these parameters can be calculated from Table 9 and Table 10 as the following values and satisfy the following relationships:

| f (mm) | 2.83 | R7/f | −0.28 |
|---|---|---|---|
| Fno | 2.32 | f/f1 + |f/f2| | 0.60 |
| HFOV (deg.) | 43.0 | f/f3 + |f/f4| | 1.80 |
| V5/V4 | 2.40 | f3/f1 | 0.53 |
| Σ CT/TD | 0.78 | TTL/ImgH | 1.66 |

6th Embodiment

Figure 11:
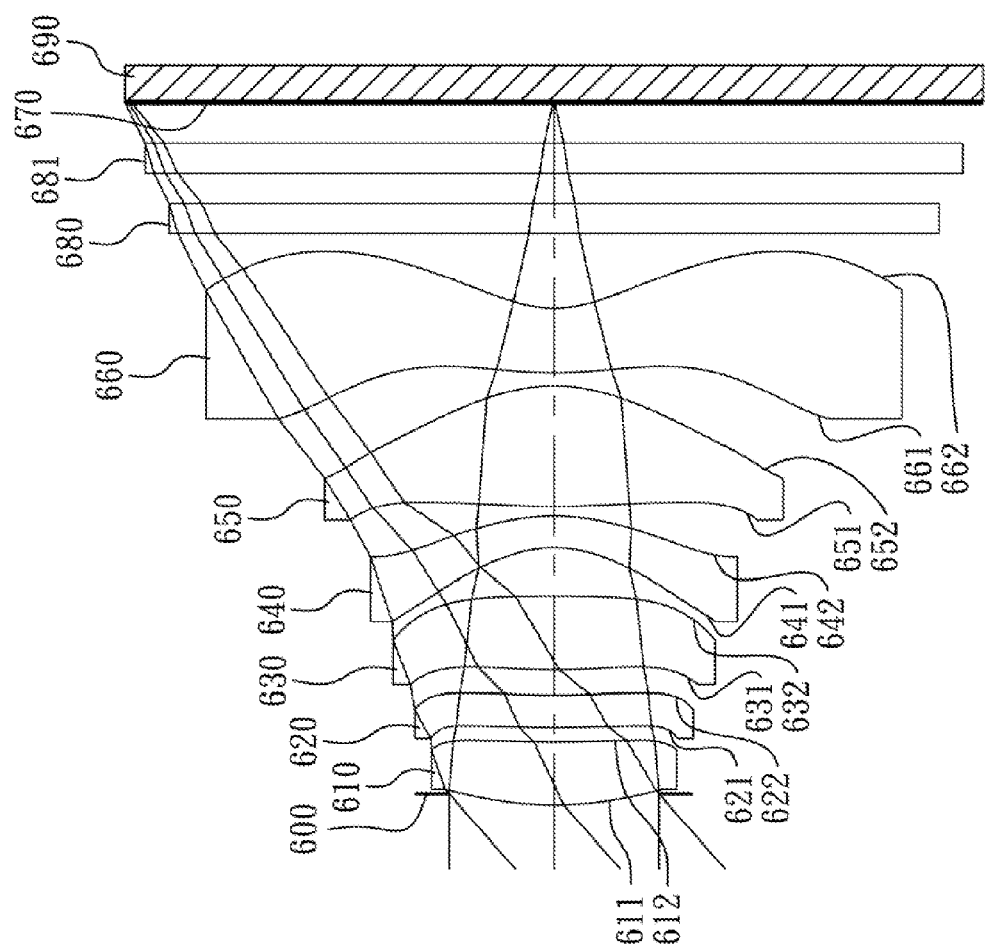
FIG. 11 is a schematic view of an optical image system according to the 6th embodiment of the present disclosure.
Figure 12:
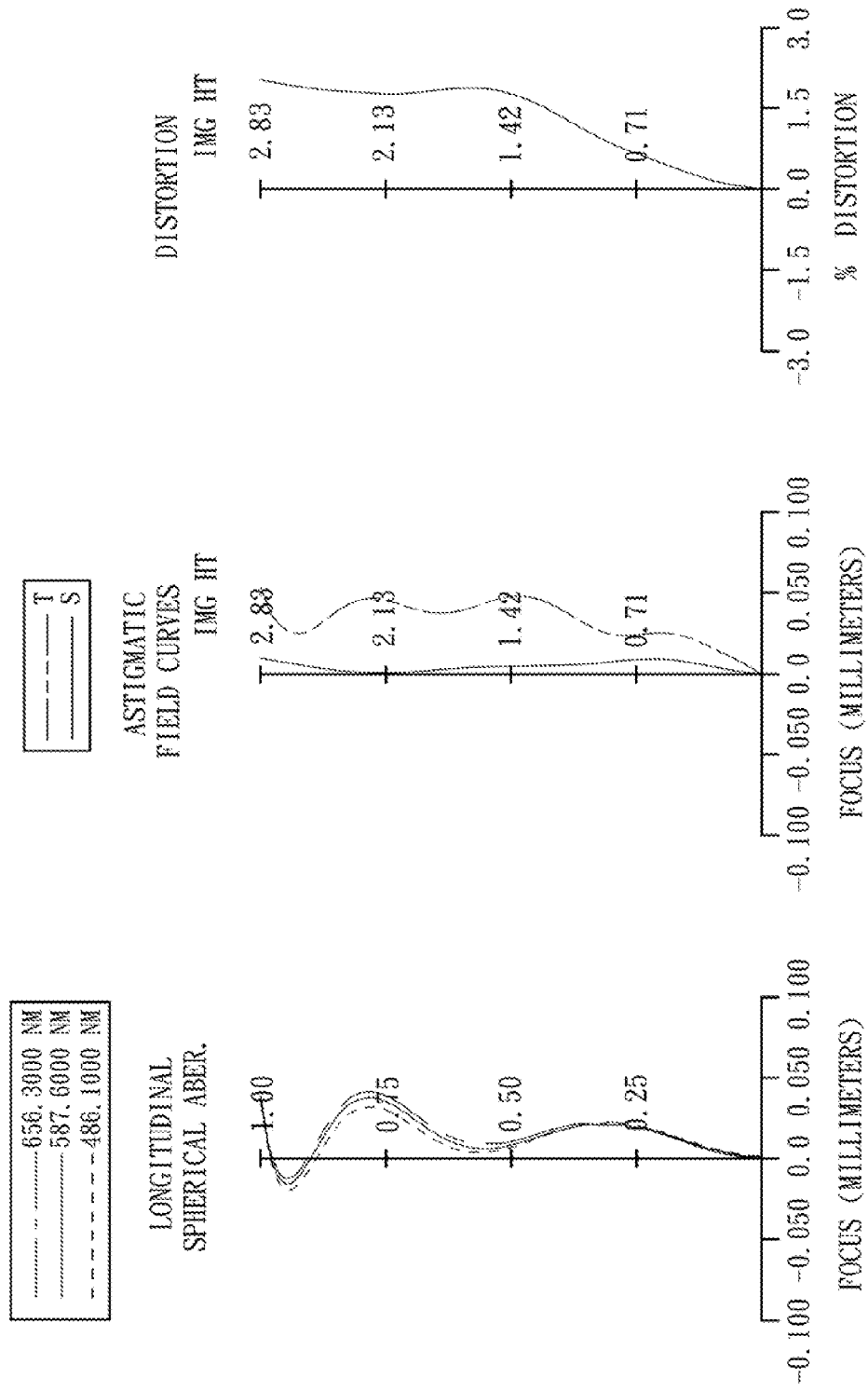
FIG. 12 shows spherical aberration curves, astigmatic field curves and a distortion curve of the optical image system according to the 6th embodiment.

FIG. 11 is a schematic view of an optical image system according to the 6th embodiment of the present disclosure. FIG. 12 shows spherical aberration curves, astigmatic field curves and a distortion curve of the optical image system according to the 6th embodiment. In FIG. 11, the optical image system includes, in order from an object side to an image side, an aperture stop 600, a first lens element 610, a second lens element 620, a third lens element 630, a fourth lens element 640, a fifth lens element 650, a sixth lens element 660, an IR-cut filter 680, a cover glass 681, an image plane 670 and an image sensor 690.

The first lens element 610 with positive refractive power has a convex object-side surface 611 and a concave image-side surface 612. The first lens element 610 is made of glass material and has the object-side surface 611 and the image-side surface 612 being aspheric.

The second lens element 620 with negative refractive power has a convex object-side surface 621 and a concave image-side surface 622. The second lens element 620 is made of plastic material and has the object-side surface 621 and the image-side surface 622 being aspheric.

The third lens element 630 with positive refractive power has a convex object-side surface 631 and a convex image-side surface 632. The third lens element 630 is made of plastic material and has the object-side surface 631 and the image-side surface 632 being aspheric.

The fourth lens element 640 with negative refractive power has a concave object-side surface 641 and a convex image-side surface 642. The fourth lens element 640 is made of plastic material and has the object-side surface 641 and the image-side surface 642 being aspheric.

The fifth lens element 650 with positive refractive power has a convex object-side surface 651 and a convex image-side surface 652. The fifth lens element 650 is made of plastic material and has the object-side surface 651 and the image-side surface 652 being aspheric.

The sixth lens element 660 with negative refractive power has a convex object-side surface 661 and a concave image-side surface 662. The sixth lens element 660 is made of plastic material and has the object-side surface 661 and the image-side surface 662 being aspheric. Furthermore, the image-side surface 662 of the sixth lens element 660 changes from concave at the paraxial region to convex at the peripheral region.

The IR-cut filter 680 is made of glass, and located between the sixth lens element 660 and the image plane 670. The cover glass 681 is located between the IR-cut filter 680 and the image plane 670. The IR-cut filter 680 and the cover glass 681 will not affect the focal length of the optical image system.

The detailed optical data of the 6th embodiment are shown in Table 11 and the aspheric surface data are shown in Table 12 below.

TABLE 11

6th Embodiment
f = 3.14 mm, Fno = 2.25, HFOV = 41.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.074 | | | | |
| 2 | Lens 1 | 2.306 (ASP) | 0.421 | Glass | 1.592 | 68.4 | 4.93 |
| 3 | | 10.256 (ASP) | 0.100 | | | | |
| 4 | Lens 2 | 9.118 (ASP) | 0.213 | Plastic | 1.640 | 23.3 | −17.36 |
| 5 | | 4.961 (ASP) | 0.168 | | | | |
| 6 | Lens 3 | 3.789 (ASP) | 0.494 | Plastic | 1.544 | 55.9 | 5.29 |
| 7 | | −11.438 (ASP) | 0.320 | | | | |
| 8 | Lens 4 | −0.789 (ASP) | 0.211 | Plastic | 1.640 | 23.3 | −3.29 |
| 9 | | −1.394 (ASP) | 0.065 | | | | |
| 10 | Lens 5 | 4.941 (ASP) | 0.806 | Plastic | 1.544 | 55.9 | 1.63 |
| 11 | | −1.022 (ASP) | 0.086 | | | | |
| 12 | Lens 6 | 2.508 (ASP) | 0.427 | Plastic | 1.535 | 56.3 | −2.07 |
| 13 | | 0.723 (ASP) | 0.500 | | | | |
| 14 | IR-cut filter | Plano | 0.200 | Glass | 1.517 | 64.2 | — |
| 15 | | Plano | 0.200 | | | | |
| 16 | Cover glass | Plano | 0.200 | Glass | 1.517 | 64.2 | — |
| 17 | | Plano | 0.274 | | | | |
| 18 | Image | Plano | — | | | | |

Note:
Reference wavelength (d-line) is 587.6 nm.

TABLE 12

Aspheric Coefficients

| | Surface # | | | | | |
|---|---|---|---|---|---|---|
| | 2 | 3 | 4 | 5 | 6 | 7 |
| k = | −3.5040E+00 | 6.1588E−01 | −1.0000E+00 | −1.0000E+00 | −1.3472E+01 | 1.0000E+00 |
| A4 = | −5.7619E−03 | −4.9819E−02 | −1.5825E−01 | −2.6246E−01 | −1.9123E−01 | −4.2720E−02 |
| A6 = | 2.4900E−01 | −3.4447E−02 | 5.4310E−01 | 3.7353E−01 | −2.6620E−02 | −1.7326E−01 |
| A8 = | −1.1440E+00 | 3.7188E−01 | −1.1755E+00 | −2.8159E−01 | 9.5638E−02 | 4.1009E−02 |
| A10 = | 1.1570E+00 | −1.2682E+00 | 1.1051E+00 | 4.3100E−03 | −1.4145E−01 | −5.3248E−03 |
| A12 = | 2.0282E+00 | 6.6948E−01 | 1.4439E−02 | −2.7815E−01 | −1.1048E−01 | 3.2409E−03 |
| A14 = | −3.6199E+00 | −3.4242E−01 | −1.9141E+00 | 1.1117E−01 | 1.2588E−01 | 2.3096E−03 |

| | Surface # | | | | | |
|---|---|---|---|---|---|---|
| | 8 | 9 | 10 | 11 | 12 | 13 |
| k = | −1.7280E+00 | −3.1098E+00 | 5.8130E−01 | −5.5425E+00 | −2.4635E+01 | −4.5089E+00 |
| A4 = | 3.5773E−01 | 1.3623E−01 | −1.6078E−01 | −7.2622E−02 | −1.3570E−01 | −8.0109E−02 |
| A6 = | −8.8051E−01 | −2.7263E−01 | 1.6178E−01 | −8.8509E−03 | 3.4682E−02 | 2.4470E−02 |
| A8 = | 1.1299E+00 | 3.3128E−01 | −9.4729E−02 | 1.0505E−01 | −5.8503E−03 | −6.2542E−03 |
| A10 = | −9.2787E−01 | −2.4293E−01 | 1.4923E−01 | −8.5653E−02 | 6.7790E−04 | 1.1022E−03 |
| A12 = | 5.9347E−01 | 1.2987E−01 | 9.6506E−04 | 2.6145E−02 | 2.1275E−04 | −1.2116E−04 |
| A14 = | −1.9935E−01 | −3.2818E−02 | −1.9584E−04 | −2.6385E−03 | −4.7343E−05 | 6.0335E−06 |

In the optical image system according to the 6th embodiment, the definitions of f, Fno, HFOV, V4, V5, ΣCT, TD, R7, f1, f2, f3, f4, TTL and ImgH are the same as those stated in the 1st embodiment with corresponding values for the 6th embodiment. Moreover, these parameters can be calculated from Table 11 and Table 12 as the following values and satisfy the following relationships:

| f (mm) | 3.14 | R7/f | −0.25 |
|---|---|---|---|
| Fno | 2.25 | f/f1 + |f/f2| | 0.82 |
| HFOV (deg.) | 41.4 | f/f3 + |f/f4| | 1.55 |
| V5/V4 | 2.40 | f3/f1 | 1.07 |
| ΣCT/TD | 0.78 | TTL/ImgH | 1.61 |

7th Embodiment

Figure 13:
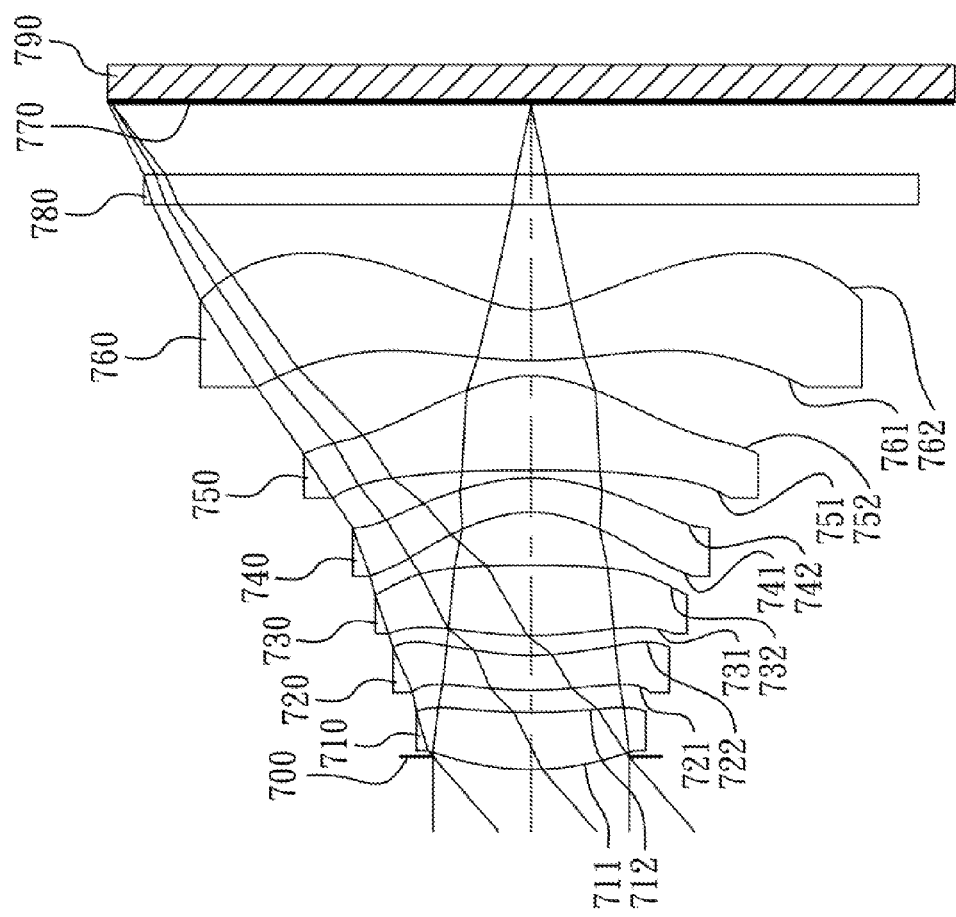
FIG. 13 is a schematic view of an optical image system according to the 7th embodiment of the present disclosure.
Figure 14:
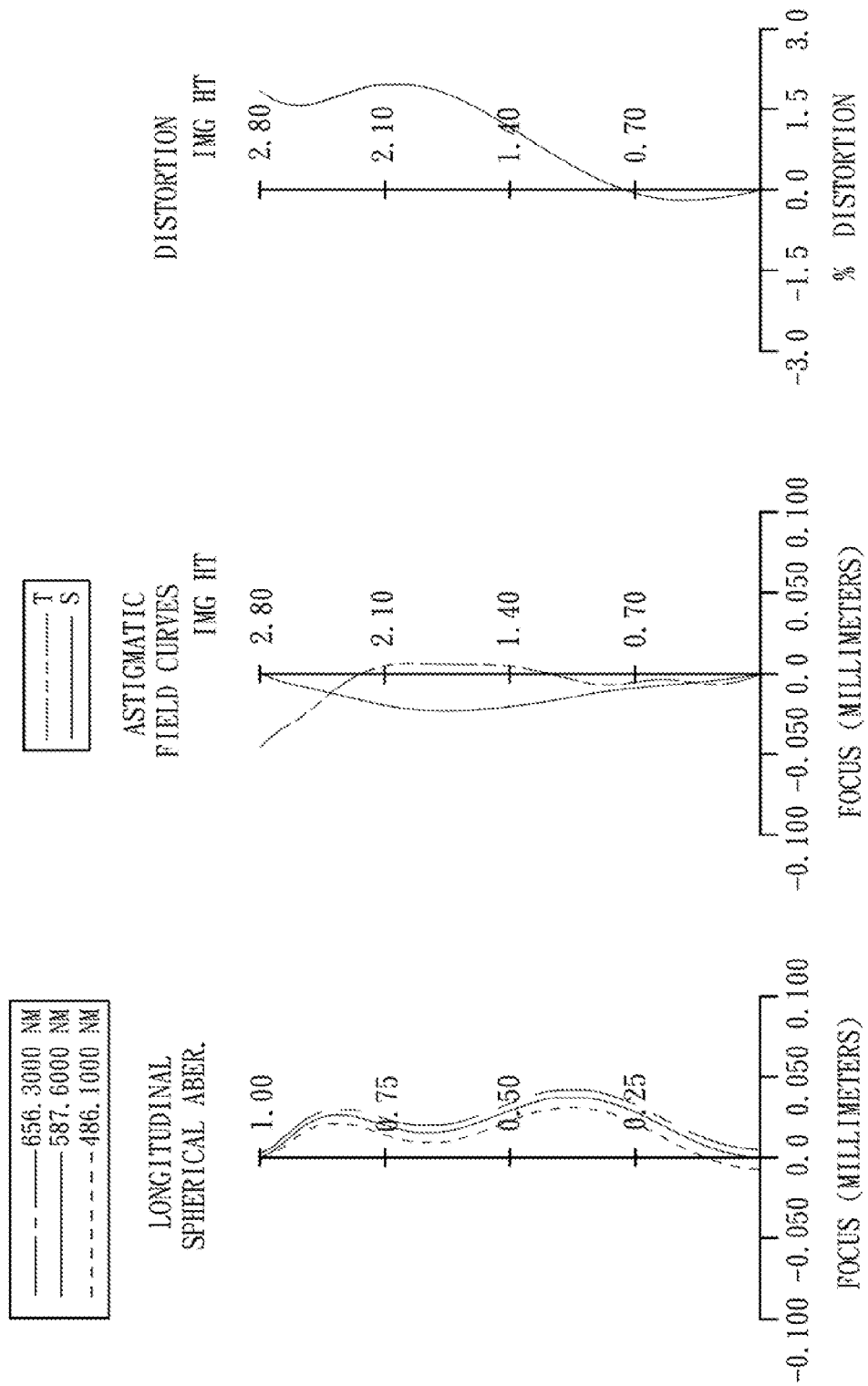
FIG. 14 shows spherical aberration curves, astigmatic field curves and a distortion curve of the optical image system according to the 7th embodiment.

FIG. 13 is a schematic view of an optical image system according to the 7th embodiment of the present disclosure. FIG. 14 shows spherical aberration curves, astigmatic field curves and a distortion curve of the optical image system according to the 7th embodiment. In FIG. 13, the optical image system includes, in order from an object side to an image side, an aperture stop 700, a first lens element 710, a second lens element 720, a third lens element 730, a fourth lens element 740, a fifth lens element 750, a sixth lens element 760, an IR-cut filter 780, an image plane 770 and an image sensor 790.

The first lens element 710 with positive refractive power has a convex object-side surface 711 and a concave image-side surface 712. The first lens element 710 is made of plastic material and has the object-side surface 711 and the image-side surface 712 being aspheric.

The second lens element 720 with negative refractive power has a convex object-side surface 721 and a concave image-side surface 722. The second lens element 720 is made of plastic material and has the object-side surface 721 and the image-side surface 722 being aspheric.

The third lens element 730 with positive refractive power has a convex object-side surface 731 and a convex image-side surface 732. The third lens element 730 is made of plastic material and has the object-side surface 731 and the image-side surface 732 being aspheric.

The fourth lens element 740 with negative refractive power has a concave object-side surface 741 and a convex image-side surface 742. The fourth lens element 740 is made of plastic material and has the object-side surface 741 and the image-side surface 742 being aspheric.

The fifth lens element 750 with positive refractive power has a concave object-side surface 751 and a convex image-side surface 752. The fifth lens element 750 is made of plastic material and has the object-side surface 751 and the image-side surface 752 being aspheric.

The sixth lens element 760 with negative refractive power has a convex object-side surface 761 and a concave image-side surface 762. The sixth lens element 760 is made of plastic material and has the object-side surface 761 and the image-side surface 762 being aspheric. Furthermore, the image-side surface 762 of the sixth lens element 760 changes from concave at the paraxial region to convex at the peripheral region.

The IR-cut filter 780 is made of glass, and located between the sixth lens element 760 and the image plane 770, and will not affect the focal length of the optical image system.

The detailed optical data of the 7th embodiment are shown in Table 13 and the aspheric surface data are shown in Table 14 below.

TABLE 13

7th Embodiment
f = 3.13 mm, Fno = 2.40, HFOV = 41.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.086 | | | | |
| 2 | Lens 1 | 1.831 (ASP) | 0.384 | Plastic | 1.544 | 55.9 | 6.17 |
| 3 | | 3.732 (ASP) | 0.145 | | | | |
| 4 | Lens 2 | 2.642 (ASP) | 0.232 | Plastic | 1.633 | 23.4 | −9.29 |
| 5 | | 1.760 (ASP) | 0.132 | | | | |
| 6 | Lens 3 | 2.434 (ASP) | 0.468 | Plastic | 1.544 | 55.9 | 3.51 |
| 7 | | −8.297 (ASP) | 0.354 | | | | |
| 8 | Lens 4 | −0.811 (ASP) | 0.232 | Plastic | 1.633 | 23.4 | −4.40 |
| 9 | | −1.271 (ASP) | 0.050 | | | | |
| 10 | Lens 5 | −36.324 (ASP) | 0.631 | Plastic | 1.544 | 55.9 | 1.45 |
| 11 | | −0.774 (ASP) | 0.103 | | | | |
| 12 | Lens 6 | 2.886 (ASP) | 0.335 | Plastic | 1.544 | 55.9 | −1.60 |
| 13 | | 0.641 (ASP) | 0.700 | | | | |
| 14 | IR-cut filter | Plano | 0.200 | Glass | 1.517 | 64.2 | — |
| 15 | | Plano | 0.486 | | | | |
| 16 | Image | Plano | — | | | | |

Note:
Reference wavelength (d-line) is 587.6 nm.

TABLE 14

Aspheric Coefficients

| | Surface # | | | | | |
|---|---|---|---|---|---|---|
| | 2 | 3 | 4 | 5 | 6 | 7 |
| k = | −2.8265E+00 | −4.0482E+00 | −1.6088E+01 | −5.7897E+00 | −1.6237E+00 | −1.0000E+00 |
| A4 = | 8.6803E−03 | −7.5541E−02 | −2.1967E−01 | −2.5963E−01 | −1.6535E−01 | 4.2732E−03 |
| A6 = | 3.4519E−01 | −1.3257E−01 | 4.7331E−01 | 3.8748E−01 | −6.3021E−02 | −1.8577E−01 |
| A8 = | −1.3180E+00 | 4.3824E−01 | −1.1747E+00 | −3.2281E−01 | 1.1788E−01 | 2.9815E−02 |
| A10 = | 1.1984E+00 | −1.2998E+00 | 1.1553E+00 | 1.0281E−01 | −1.1359E−01 | 5.0406E−03 |
| A12 = | 2.0282E+00 | 6.6948E−01 | 1.4310E−02 | −2.7697E−01 | −1.1044E−01 | 2.8787E−02 |
| A14 = | −3.6199E+00 | −3.4242E−01 | −1.9141E+00 | 1.1116E−01 | 1.2591E−01 | 2.7177E−03 |

| | Surface # | | | | | |
|---|---|---|---|---|---|---|
| | 8 | 9 | 10 | 11 | 12 | 13 |
| k = | −1.5693E+00 | −2.3513E+00 | −2.0000E+01 | −4.7773E+00 | −4.7432E+00 | −4.9064E+00 |
| A4 = | 3.7123E−01 | 1.2315E−01 | −1.3859E−01 | −5.6386E−02 | −1.2300E−01 | −7.5427E−02 |
| A6 = | −8.5438E−01 | −2.7490E−01 | 1.7149E−01 | 3.7777E−02 | 3.4050E−02 | 2.2913E−02 |
| A8 = | 1.1430E+00 | 3.3235E−01 | −9.8879E−02 | 1.0819E−01 | −6.3240E−03 | −6.2205E−03 |
| A10 = | −9.2415E−01 | −2.4204E−01 | 1.4634E−02 | −8.5354E−02 | 4.5304E−04 | 1.0703E−03 |
| A12 = | 5.9624E−01 | 1.3039E−01 | 1.5814E−03 | 2.5726E−02 | 1.9031E−04 | −1.2687E−04 |
| A14 = | −2.0661E−01 | −3.1864E−02 | −2.8098E−04 | −2.9866E−03 | −4.0440E−05 | 7.6515E−06 |

In the optical image system according to the 7th embodiment, the definitions of f, Fno, HFOV, V4, V5, ΣCT, TD, R7, f1, f2, f3, f4, TTL and ImgH are the same as those stated in the 1st embodiment with corresponding values for the 7th embodiment. Moreover, these parameters can be calculated from Table 13 and Table 14 as the following values and satisfy the following relationships:

| f (mm) | 3.13 | R7/f | −0.26 |
|---|---|---|---|
| Fno | 2.40 | f/f1 + \|f/f2\| | 0.85 |
| HFOV (deg.) | 41.1 | f/f3 + \|f/f4\| | 1.60 |
| V5/V4 | 2.39 | f3/f1 | 0.57 |
| Σ CT/TD | 0.74 | TTL/ImgH | 1.57 |

8th Embodiment

Figure 15:
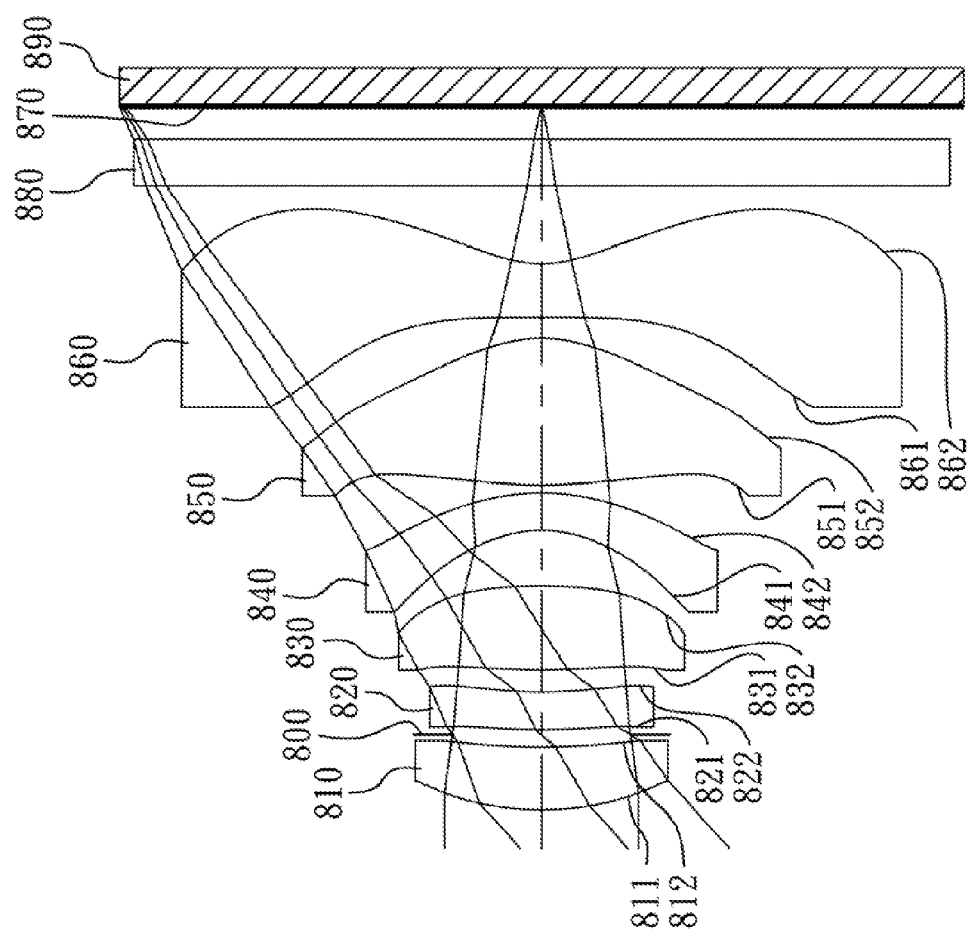
FIG. 15 is a schematic view of an optical image system according to the 8th embodiment of the present disclosure.
Figure 16:
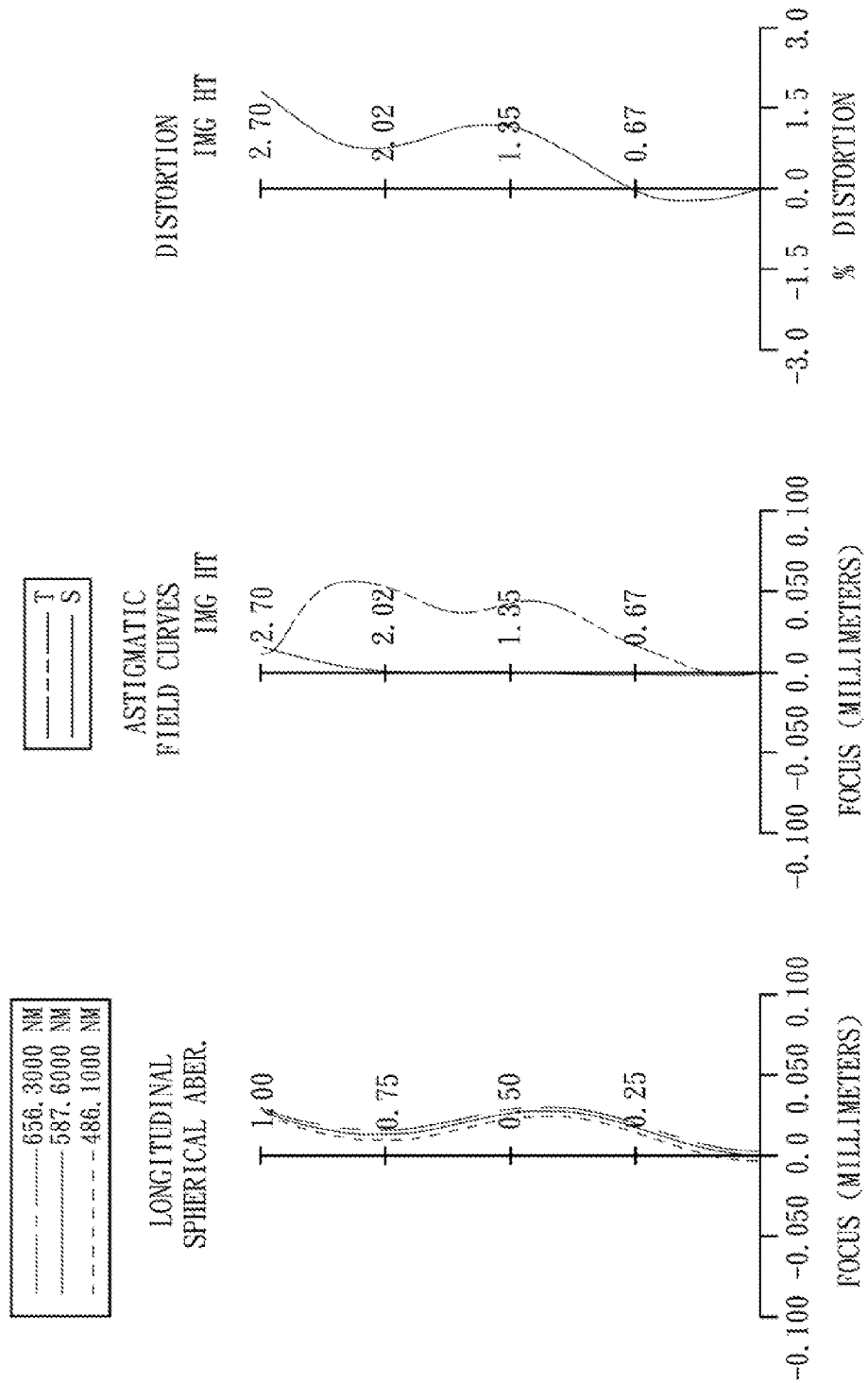
FIG. 16 shows spherical aberration curves, astigmatic field curves and a distortion curve of the optical image system according to the 8th embodiment.

FIG. 15 is a schematic view of an optical image system according to the 8th embodiment of the present disclosure. FIG. 16 shows spherical aberration curves, astigmatic field curves and a distortion curve of the optical image system according to the 8th embodiment. In FIG. 15, the optical image system includes, in order from an object side to an image side, a first lens element 810, an aperture stop 800, a second lens element 820, a third lens element 830, a fourth lens element 840, a fifth lens element 850, a sixth lens element 860, an IR-cut filter 880, an image plane 870 and an image sensor 890.

The first lens element 810 with positive refractive power has a convex object-side surface 811 and a concave image-side surface 812. The first lens element 810 is made of plastic material and has the object-side surface 811 and the image-side surface 812 being aspheric.

The second lens element 820 with negative refractive power has a convex object-side surface 821 and a concave image-side surface 822. The second lens element 820 is made of plastic material and has the object-side surface 821 and the image-side surface 822 being aspheric.

The third lens element 830 with positive refractive power has a convex object-side surface 831 and a convex image-side surface 832. The third lens element 830 is made of plastic material and has the object-side surface 831 and the image-side surface 832 being aspheric.

The fourth lens element 840 with negative refractive power has a concave object-side surface 841 and a convex image-side surface 842. The fourth lens element 840 is made of plastic material and has the object-side surface 841 and the image-side surface 842 being aspheric.

The fifth lens element 850 with positive refractive power has a convex object-side surface 851 and a convex image-side surface 852. The fifth lens element 850 is made of plastic material and has the object-side surface 851 and the image-side surface 852 being aspheric.

The sixth lens element 860 with negative refractive power has a concave object-side surface 861 and a concave image-side surface 862. The sixth lens element 860 is made of plastic material and has the object-side surface 861 and the image-side surface 862 being aspheric. Furthermore, the image-side surface 862 of the sixth lens element 860 changes from concave at the paraxial region to convex at the peripheral region.

The IR-cut filter 880 is made of glass, and located between the sixth lens element 860 and the image plane 870, and will not affect the focal length of the optical image system.

The detailed optical data of the 8th embodiment are shown in Table 15 and the aspheric surface data are shown in Table 16 below.

TABLE 15

8th Embodiment
f = 2.93 mm, Fno = 2.35, HFOV = 42.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.935 (ASP) | 0.408 | Plastic | 1.544 | 55.9 | 5.87 |
| 2 | | 4.549 (ASP) | 0.079 | | | | |
| 3 | Ape. Stop | Plano | 0.032 | | | | |
| 4 | Lens 2 | 3.599 (ASP) | 0.240 | Plastic | 1.640 | 23.3 | −13.65 |
| 5 | | 2.482 (ASP) | 0.143 | | | | |
| 6 | Lens 3 | 4.233 (ASP) | 0.541 | Plastic | 1.544 | 55.9 | 3.39 |
| 7 | | −3.117 (ASP) | 0.359 | | | | |
| 8 | Lens 4 | −0.772 (ASP) | 0.244 | Plastic | 1.640 | 23.3 | −3.20 |
| 9 | | −1.392 (ASP) | 0.050 | | | | |
| 10 | Lens 5 | 3.172 (ASP) | 0.944 | Plastic | 1.544 | 55.9 | 1.32 |
| 11 | | −0.831 (ASP) | 0.134 | | | | |
| 12 | Lens 6 | −100.000 (ASP) | 0.350 | Plastic | 1.544 | 55.9 | −1.29 |
| 13 | | 0.710 (ASP) | 0.500 | | | | |
| 14 | IR-cut filter | Plano | 0.300 | Glass | 1.517 | 64.2 | — |
| 15 | | Plano | 0.212 | | | | |
| 16 | Image | Plano | — | | | | |

Note:
Reference wavelength (d-line) is 587.6 nm.

TABLE 16

Aspheric Coefficients

| | Surface # | | | | |
|---|---|---|---|---|---|
| 1 | 2 | 4 | 5 | 6 | 7 |
| k = −1.5336E+00 | −4.6083E+00 | −1.0000E+00 | −1.0000E+00 | −1.5150E+01 | 2.9331E+00 |
| A4 = 1.9520E−02 | −1.2550E−02 | −2.8065E−01 | −3.3730E−01 | −1.5631E−01 | −8.8692E−02 |
| A6 = 2.5589E−01 | 7.3103E−02 | 4.7850E−01 | 4.1201E−01 | 4.1877E−02 | −1.2953E−01 |

TABLE 16-continued

| Aspheric Coefficients | | | | | |
|---|---|---|---|---|---|
| A8 = | −5.6127E−01 | 3.2193E−01 | −9.4055E−01 | −3.4226E−01 | 3.4525E−02 | 1.5957E−02 |
| A10 = | 2.5586E−01 | −1.6686E+00 | 9.0758E−02 | −7.1483E−01 | −2.3656E−01 | −2.7020E−02 |
| A12 = | 9.5445E−01 | 6.6948E−01 | 1.4432E−02 | 6.9966E−01 | −1.0910E−01 | −2.7703E−03 |
| A14 = | −1.1810E+00 | −3.4243E−01 | −1.9141E+00 | 1.1117E−01 | 2.0917E−01 | −2.0349E−02 |

| Surface # | | | | | |
|---|---|---|---|---|---|
| | 8 | 9 | 10 | 11 | 12 | 13 |
| k = | −1.2683E+00 | −2.1661E+00 | −2.3974E−01 | −5.1472E+00 | 1.0000E+00 | −5.6737E+00 |
| A4 = | 3.1178E−01 | 1.0863E−01 | −1.6680E−01 | −4.0952E−02 | −1.4364E−01 | −6.7809E−02 |
| A6 = | −9.0290E− | −2.9035E−01 | 1.5292E−01 | −1.7583E−02 | 3.7535E−02 | 2.1287E−02 |
| A8 = | 1.1143E+00 | 3.2520E−01 | −9.4849E−02 | 1.0138E−01 | −5.9256E−03 | −6.2916E−03 |
| A10 = | −9.4017E−01 | −2.4287E−01 | 1.4866E−02 | −8.6289E−02 | 5.9978E−04 | 1.1497E−03 |
| A12 = | 6.0474E−01 | 1.3275E−01 | 3.2152E−04 | 2.6164E−02 | 1.9036E−04 | −1.2007E−04 |
| A14 = | −1.7233E−01 | −3.0624E−02 | −3.6862E−04 | −2.4934E−03 | −3.5082E−05 | 5.1067E−06 |

In the optical image system according to the 8th embodiment, the definitions of f, Fno, HFOV, V4, V5, ΣCT, TD, R7, f1, f2, f3, f4, TTL and ImgH are the same as those stated in the 1st embodiment with corresponding values for the 8th embodiment. Moreover, these parameters can be calculated from Table 15 and Table 16 as the following values and satisfy the following relationships:

| f (mm) | 2.93 | R7/f | −0.26 |
|---|---|---|---|
| Fno | 2.35 | f/f1 + |f/f2| | 0.72 |
| HFOV (deg.) | 42.0 | f/f3 + |f/f4| | 1.78 |
| V5/V4 | 2.40 | f3/f1 | 0.58 |
| Σ CT/TD | 0.77 | TTL/ImgH | 1.64 |

9th Embodiment

Figure 17:
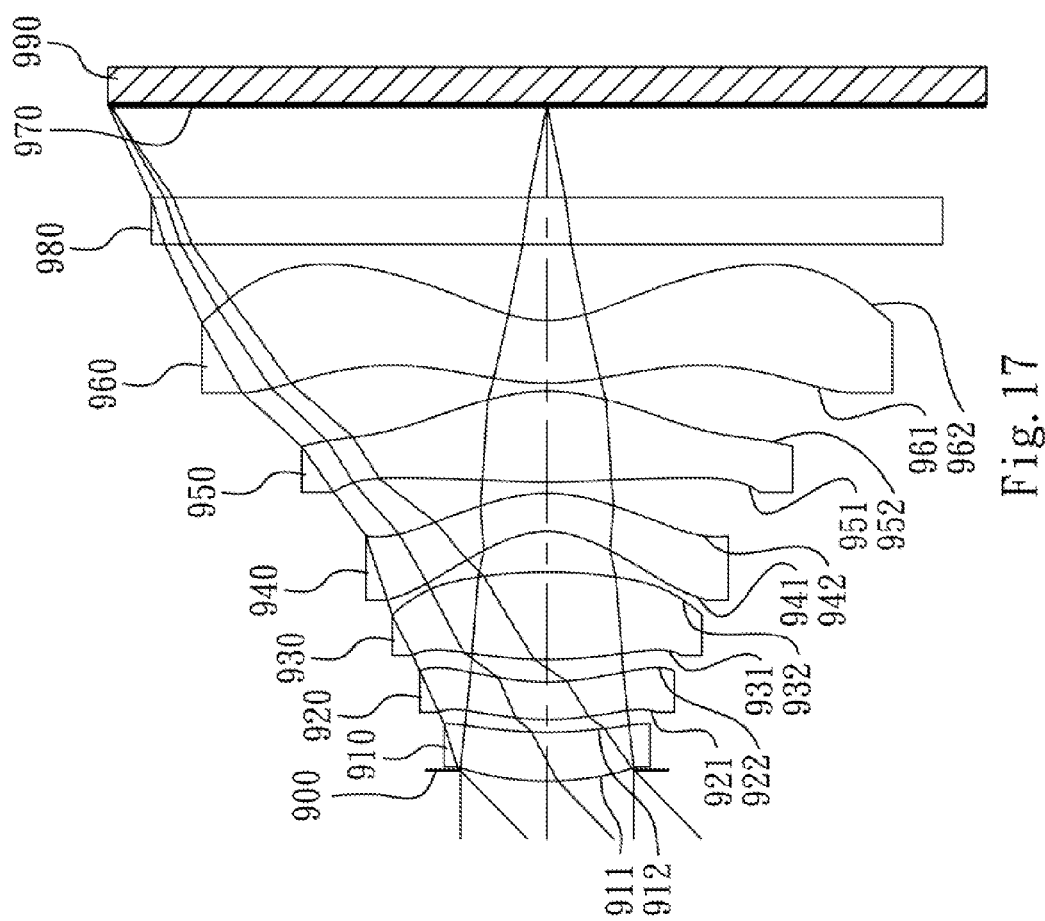
FIG. 17 is a schematic view of an optical image system according to the 9th embodiment of the present disclosure.
Figure 18:
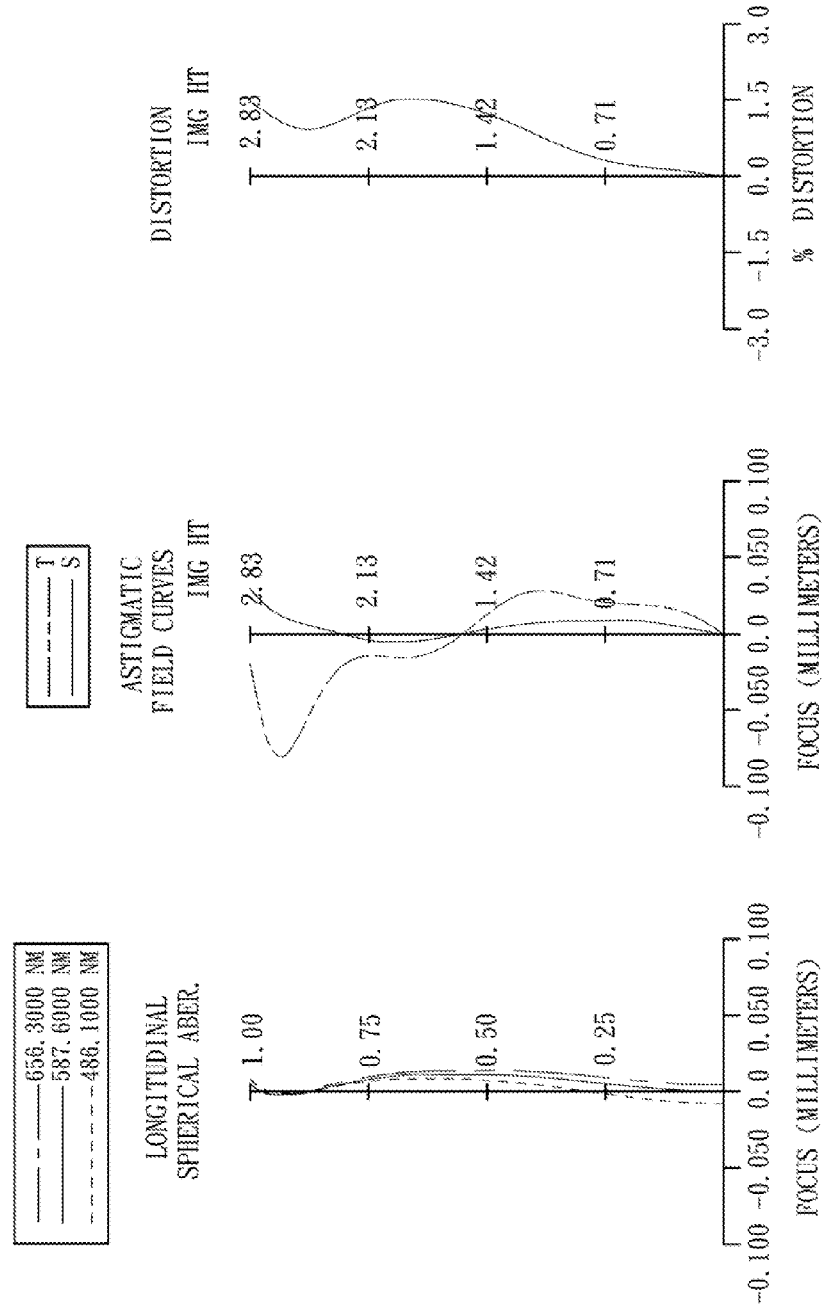
FIG. 18 shows spherical aberration curves, astigmatic field curves and a distortion curve of the optical image system according to the 9th embodiment.

FIG. 17 is a schematic view of an optical image system according to the 9th embodiment of the present disclosure. FIG. 18 shows spherical aberration curves, astigmatic field curves and a distortion curve of the optical image system according to the 9th embodiment. In FIG. 17, the optical image system includes, in order from an object side to an image side, an aperture stop 900, a first lens element 910, a second lens element 920, a third lens element 930, a fourth lens element 940, a fifth lens element 950, a sixth lens element 960, an IR-cut filter 980, an image plane 970 and an image sensor 990.

The first lens element 910 with positive refractive power has a convex object-side surface 911 and a concave image-side surface 912. The first lens element 910 is made of plastic material and has the object-side surface 911 and the image-side surface 912 being aspheric.

The second lens element 920 with negative refractive power has a convex object-side surface 921 and a concave image-side surface 922. The second lens element 920 is made of plastic material and has the object-side surface 921 and the image-side surface 922 being aspheric.

The third lens element 930 with positive refractive power has a convex object-side surface 931 and a convex image-side surface 932. The third lens element 930 is made of plastic material and has the object-side surface 931 and the image-side surface 932 being aspheric.

The fourth lens element 940 with negative refractive power has a concave object-side surface 941 and a convex image-side surface 942. The fourth lens element 940 is made of plastic material and has the object-side surface 941 and the image-side surface 942 being aspheric.

The fifth lens element 950 with positive refractive power has a convex object-side surface 951 and a convex image-side surface 952. The fifth lens element 950 is made of plastic material and has the object-side surface 951 and the image-side surface 952 being aspheric.

The sixth lens element 960 with negative refractive power has a convex object-side surface 961 and a concave image-side surface 962. The sixth lens element 960 is made of plastic material and has the object-side surface 961 and the image-side surface 962 being aspheric. Furthermore, the image-side surface 962 of the sixth lens element 960 changes from concave at the paraxial region to convex at the peripheral region.

The IR-cut filter 980 is made of glass, and located between the sixth lens element 960 and the image plane 970, and will not affect the focal length of the optical image system.

The detailed optical data of the 9th embodiment are shown in Table 17 and the aspheric surface data are shown in Table 18 below.

TABLE 17

9th Embodiment
f = 2.88 mm, Fno = 2.55, HFOV = 44.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.072 | | | | |
| 2 | Lens 1 | 1.972 (ASP) | 0.321 | Plastic | 1.544 | 55.9 | 12.56 |
| 3 | | 2.613 (ASP) | 0.083 | | | | |
| 4 | Lens 2 | 1.683 (ASP) | 0.240 | Plastic | 1.640 | 23.3 | −38.71 |
| 5 | | 1.489 (ASP) | 0.147 | | | | |
| 6 | Lens 3 | 2.576 (ASP) | 0.570 | Plastic | 1.544 | 55.9 | 2.60 |
| 7 | | −2.890 (ASP) | 0.264 | | | | |

TABLE 17-continued

9th Embodiment
f = 2.88 mm, Fno = 2.55, HFOV = 44.1 deg.

| Surface # | | Curvature Radius | Thickness | Material | Index | Abbe # | Focal length |
|---|---|---|---|---|---|---|---|
| 8 | Lens 4 | −0.563 (ASP) | 0.251 | Plastic | 1.640 | 23.3 | −2.55 |
| 9 | | −1.010 (ASP) | 0.074 | | | | |
| 10 | Lens 5 | 5.018 (ASP) | 0.592 | Plastic | 1.544 | 55.9 | 1.73 |
| 11 | | −1.111 (ASP) | 0.051 | | | | |
| 12 | Lens 6 | 1.614 (ASP) | 0.404 | Plastic | 1.544 | 55.9 | −2.62 |
| 13 | | 0.690 (ASP) | 0.500 | | | | |
| 14 | IR-cut filter | Plano | 0.300 | Glass | 1.517 | 64.2 | — |
| 15 | | Plano | 0.603 | | | | |
| 16 | Image | Plano | — | | | | |

Note:
Reference wavelength (d-line) is 587.6 nm.

TABLE 18

Aspheric Coefficients

| | Surface # | | | | | |
|---|---|---|---|---|---|---|
| | 2 | 3 | 4 | 5 | 6 | 7 |
| k = | 1.2632E+00 | −4.3821E+00 | −6.5892E+00 | −7.3546E+00 | 6.7839E−01 | −2.4213E+01 |
| A4 = | 1.0030E−02 | −1.6068E−01 | −3.0915E−01 | −1.8133E−01 | −1.3561E−01 | −2.2254E−02 |
| A6 = | 5.5650E−02 | 5.0197E−01 | 6.0909E−01 | 2.9666E−01 | −2.5469E−02 | −1.7086E−01 |
| A8 = | −2.0173E−01 | −7.8514E−01 | −9.8510E−01 | −4.2285E−01 | 6.9927E−02 | 3.7067E−02 |
| A10 = | −1.3435E−01 | −6.1660E−01 | −5.4400E−04 | 5.5311E−02 | −1.2884E−01 | −8.9276E−03 |
| A12 = | 2.0282E+00 | 6.6948E−01 | 1.4441E−02 | −2.9656E−01 | −1.6712E−01 | −1.1985E−02 |
| A14 = | −3.6199E+00 | −3.4242E−01 | −1.9141E+00 | 1.2347E−01 | 2.1664E−02 | 2.0987E−02 |

| | Surface # | | | | | |
|---|---|---|---|---|---|---|
| | 8 | 9 | 10 | 11 | 12 | 13 |
| k = | −2.1084E+00 | −3.0711E+00 | −1.2514E+01 | −7.2227E+00 | −1.0081E+01 | −4.5423E+00 |
| A4 = | 3.7856E−01 | 1.5794E−01 | −1.7171E−01 | −4.3556E−02 | −1.1032E−01 | −8.5894E−02 |
| A6 = | −8.5940E−01 | −2.6359E−01 | 1.8647E−01 | 5.5584E−02 | 3.2450E−02 | 2.6588E−02 |
| A8 = | 1.1553E+00 | 3.3387E−01 | −9.1500E−02 | 1.0479E−01 | −5.7854E−03 | −6.6392E−03 |
| A10 = | −9.1154E−01 | −2.3983E−01 | 1.1940E−02 | −8.6325E−02 | 3.9699E−04 | 1.0344E−03 |
| A12 = | 5.9648E−01 | 1.3231E−01 | 6.4114E−04 | 2.5952E−02 | 1.2193E−04 | −1.3833E−04 |
| A14 = | −2.2241E−01 | −3.6715E−02 | −1.4724E−04 | −2.7761E−03 | −1.8914E−05 | 1.1328E−05 |

In the optical image system according to the 9th embodiment, the definitions of f, Fno, HFOV, V4, V5, ΣCT, TD, R7, f1, f2, f3, f4, TTL and ImgH are the same as those stated in the 1st embodiment with corresponding values for the 9th embodiment. Moreover, these parameters can be calculated from Table 17 and Table 18 as the following values and satisfy the following relationships:

| f (mm) | 2.88 | R7/f | −0.20 |
|---|---|---|---|
| Fno | 2.55 | f/f1 + |f/f2| | 0.30 |
| HFOV (deg.) | 44.1 | f/f3 + |f/f4| | 2.23 |
| V5/V4 | 2.40 | f3/f1 | 0.21 |
| ΣCT/TD | 0.79 | TTL/ImgH | 1.52 |

10th Embodiment

Figure 19:
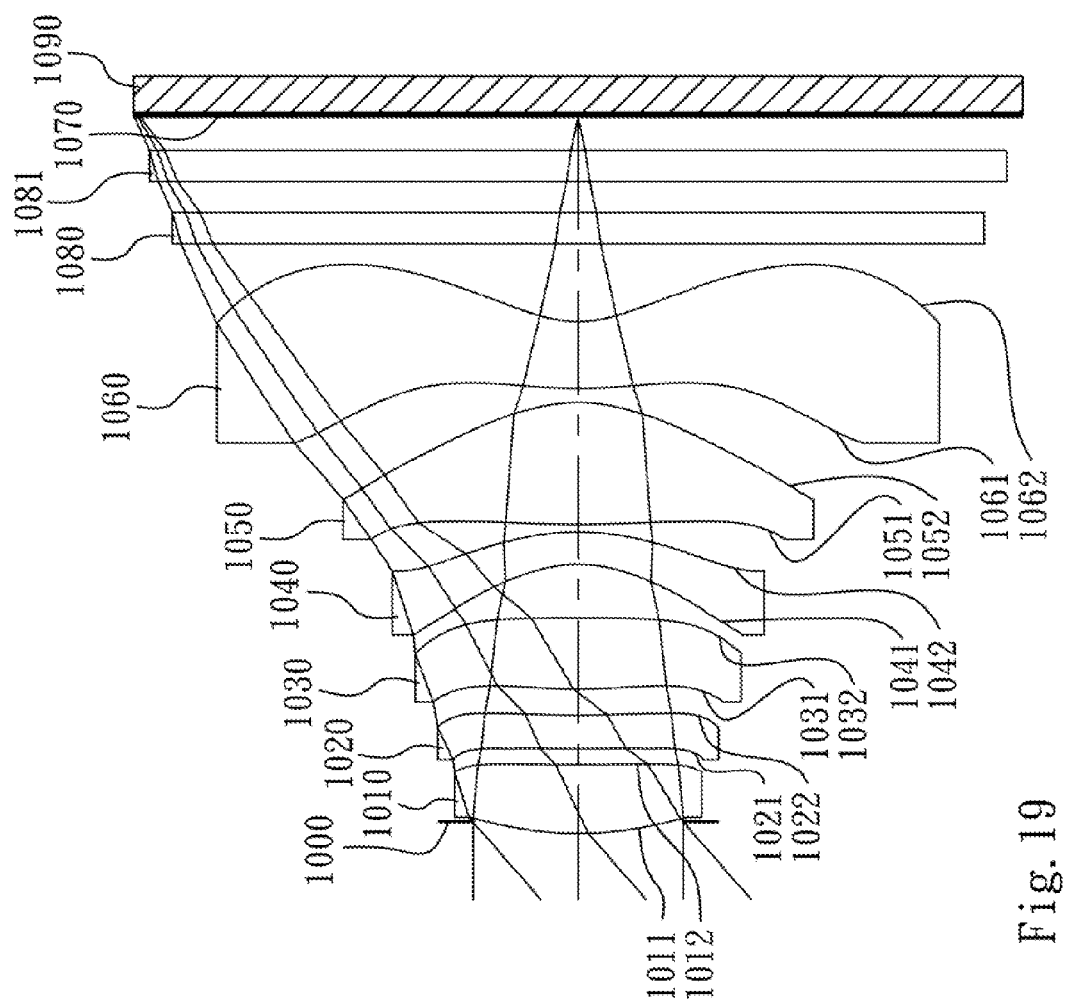
FIG. 19 is a schematic view of an optical image system according to the 10th embodiment of the present disclosure.
Figure 20:
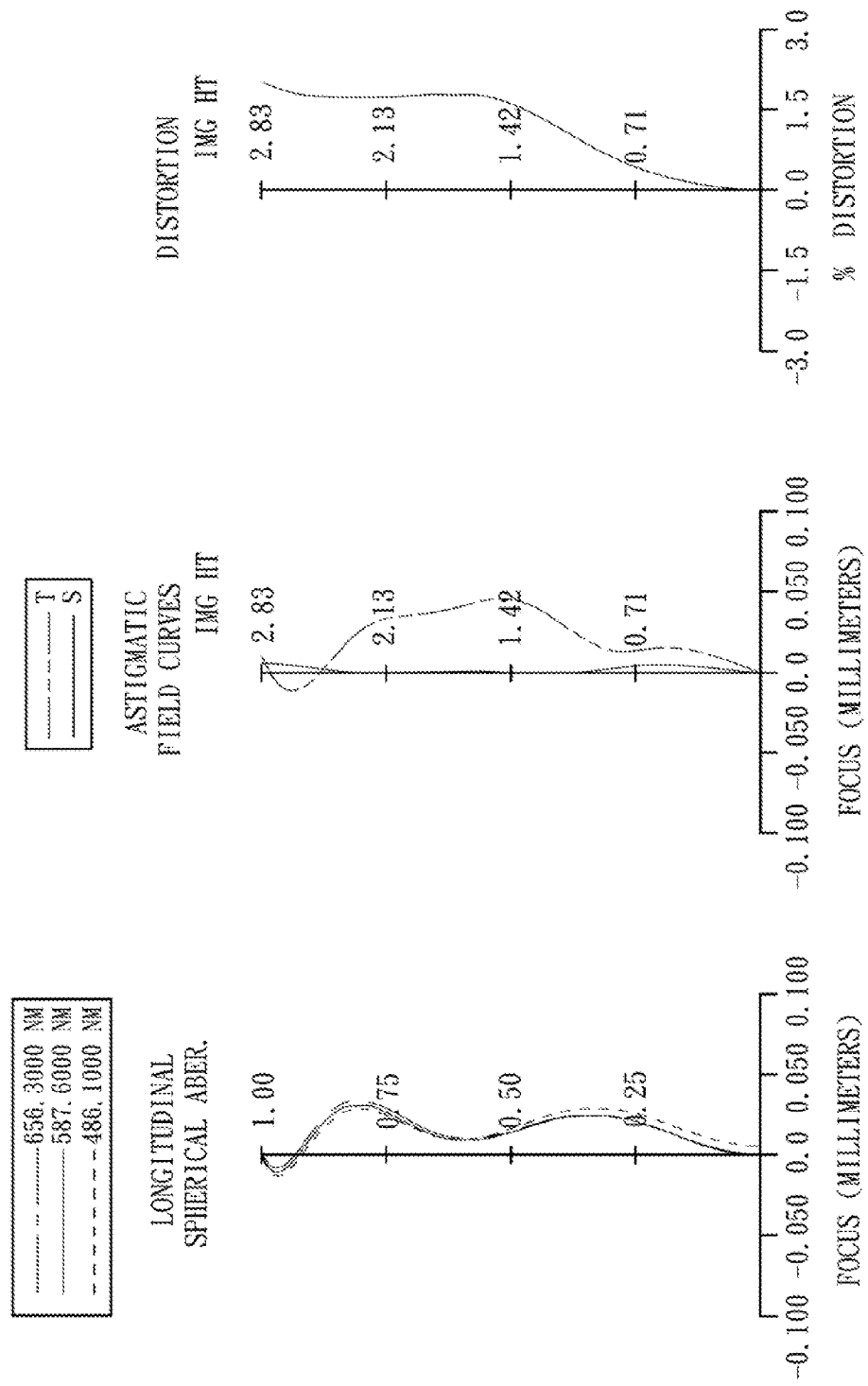
FIG. 20 shows spherical aberration curves, astigmatic field curves and a distortion curve of the optical image system according to the 10th embodiment.

FIG. 19 is a schematic view of an optical image system according to the 10th embodiment of the present disclosure. FIG. 20 shows spherical aberration curves, astigmatic field curves and a distortion curve of the optical image system according to the 10th embodiment. In FIG. 19, the optical image system includes, in order from an object side to an image side, an aperture stop 1000, a first lens element 1010, a second lens element 1020, a third lens element 1030, a fourth lens element 1040, a fifth lens element 1050, a sixth lens element 1060, an IR-cut filter 1080, a cover glass 1081 an image plane 1070 and an image sensor 1090.

The first lens element 1010 with positive refractive power has a convex object-side surface 1011 and a concave image-side surface 1012. The first lens element 1010 is made of glass material and has the object-side surface 1011 and the image-side surface 1012 being aspheric.

The second lens element 1020 with negative refractive power has a convex object-side surface 1021 and a concave image-side surface 1022. The second lens element 1020 is made of plastic material and has the object-side surface 1021 and the image-side surface 1022 being aspheric.

The third lens element 1030 with positive refractive power has a convex object-side surface 1031 and a convex image-side surface 1032. The third lens element 1030 is made of plastic material and has the object-side surface 1031 and the mage-side surface 1032 being aspheric.

The fourth lens element 1040 with negative refractive power has a concave object-side surface 1041 and a convex image-side surface 1042. The fourth lens element 1040 is made of plastic material and has the object-side surface 1041 and the image-side surface 1042 being aspheric.

The fifth lens element 1050 with positive refractive power has a convex object-side surface 1051 and a convex image-side surface 1052. The fifth lens element 1050 is made of plastic material and has the object-side surface 1051 and the image-side surface 1052 being aspheric.

The sixth lens element 1060 with negative refractive power has a convex object-side surface 1061 and a concave image-side surface 1062. The sixth lens element 1060 is made of plastic material and has the object-side surface 1061 and the image-side surface 1062 being aspheric. Furthermore, the image-side surface 1062 of the sixth lens element 1060 changes from concave at the paraxial region to convex at the peripheral region.

The IR-cut filter 1080 is made of glass, and located between the sixth lens element 1060 and the image plane 1070. The cover glass 1081 is located between the IR-cut filter 1080 and the image plane 1070. The IR-cut filter 1080 and the cover glass 1081 will not affect the focal length of the optical image system.

The detailed optical data of the 10th embodiment are shown in Table 19 and the aspheric surface data are shown in Table 20 below.

TABLE 19

10th Embodiment
f = 3.17 mm, Fno = 2.35, HFOV = 41.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.074 | | | | |
| 2 | Lens 1 | 2.213 (ASP) | 0.446 | Glass | 1.592 | 68.4 | 4.10 |
| 3 | | 22.980 (ASP) | 0.102 | | | | |
| 4 | Lens 2 | 21.427 (ASP) | 0.211 | Plastic | 1.640 | 23.3 | −10.83 |
| 5 | | 5.214 (ASP) | 0.169 | | | | |
| 6 | Lens 3 | 3.675 (ASP) | 0.460 | Plastic | 1.544 | 55.9 | 5.91 |
| 7 | | −24.449 (ASP) | 0.341 | | | | |
| 8 | Lens 4 | −0.851 (ASP) | 0.210 | Plastic | 1.640 | 23.3 | −3.59 |
| 9 | | −1.484 (ASP) | 0.050 | | | | |
| 10 | Lens 5 | 5.831 (ASP) | 0.784 | Plastic | 1.544 | 55.9 | 1.62 |
| 11 | | −0.986 (ASP) | 0.089 | | | | |
| 12 | Lens 6 | 2.769 (ASP) | 0.427 | Plastic | 1.535 | 56.3 | −1.94 |
| 13 | | 0.714 (ASP) | 0.500 | | | | |
| 14 | IR-cut filter | Plano | 0.200 | Glass | 1.517 | 64.2 | — |
| 15 | | Plano | 0.200 | | | | |
| 16 | Cover glass | Plano | 0.200 | Glass | 1.517 | 64.2 | — |
| 17 | | Plano | 0.230 | | | | |
| 18 | Image | Plano | — | | | | |

Note:
Reference wavelength (d-line) is 587.6 nm.

TABLE 20

Aspheric Coefficients

| | Surface # | | | | | |
|---|---|---|---|---|---|---|
| | 2 | 3 | 4 | 5 | 6 | 7 |
| k = | −3.4853E+00 | 1.0000E+00 | −1.0000E+00 | −1.0000E+00 | −1.5765E+01 | 1.0000E+00 |
| A4 = | −4.9313E−03 | −4.8992E−02 | −1.5686E−01 | −2.6283E−01 | −1.9495E−01 | −4.3621E−02 |
| A6 = | 2.5854E−01 | −3.5328E−02 | 5.4703E−01 | 3.7025E−01 | −3.0758E−02 | −1.7021E−01 |
| A8 = | −1.1337E+00 | 3.7721E−01 | −1.1783E+00 | −2.8678E−01 | 9.4516E−02 | 4.4012E−02 |
| A10 = | 1.1155E+00 | −1.2611E+00 | 1.0907E+00 | −4.0089E−03 | −1.3927E−01 | −3.7349E−03 |
| A12 = | 2.0282E+00 | 6.6948E−01 | 1.4439E−02 | −2.7815E−01 | −1.1048E−01 | 3.3075E−03 |
| A14 = | −3.6199E+00 | −3.4242E−01 | −1.9141E+00 | 1.1117E−01 | 1.2588E−01 | 2.3096E−03 |

| | Surface # | | | | | |
|---|---|---|---|---|---|---|
| | 8 | 9 | 10 | 11 | 12 | 13 |
| k = | −1.7609E+00 | −2.9553E+00 | 1.0000E+00 | −5.5602E+00 | −2.9482E+01 | −4.6878E+00 |
| A4 = | 3.5885E−01 | 1.3545E−01 | −1.5805E−01 | −7.3743E−02 | −1.3670E−01 | −7.9511E−02 |
| A6 = | −8.8143E−01 | −2.7205E−01 | 1.6210E−01 | −9.0893E−03 | 3.4528E−02 | 2.4007E−02 |
| A8 = | 1.1285E+00 | 3.3200E−01 | −9.5007E−02 | 1.0503E−01 | −5.8880E−03 | −6.2868E−03 |
| A10 = | −9.2893E−01 | −2.4243E−01 | 1.4739E−02 | −8.5651E−02 | 6.6908E−04 | 1.1006E−03 |
| A12 = | 5.9303E−01 | 1.3011E−01 | 8.9022E−04 | 2.6146E−02 | 2.1345E−04 | −1.2191E−04 |
| A14 = | −1.9935E−01 | −3.2696E−02 | −2.2411E−04 | −2.6353E−03 | −4.6476E−05 | 6.0132E−06 |

In the optical image system according to the 10th embodiment, the definitions of f, Fno, HFOV, V4, V5, ΣCT, TD, R7, f1, f2, f3, f4, TTL and ImgH are the same as those stated in the 1st embodiment with corresponding values for the 10th embodiment. Moreover, these parameters can be calculated from Table 19 and Table 20 as the following values and satisfy the following relationships:

| | | | |
|---|---|---|---|
| f (mm) | 3.17 | R7/f | −0.27 |
| Fno | 2.35 | f/f1 + |f/f2| | 1.07 |
| HFOV (deg.) | 41.1 | f/f3 + |f/f4| | 1.42 |
| V5/V4 | 2.40 | f3/f1 | 1.44 |
| ΣCT/TD | 0.77 | TTL/ImgH | 1.58 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical image system comprising, in order from an object side to an image side:
    a first lens element with positive refractive power having a convex object-side surface;
    second lens element with refractive power;
    a third lens element with positive refractive power having at least one of an object-side surface and an image-side surface being aspheric;
    a fourth lens element with refractive power having a concave object-side surface and a convex image-side surface, wherein at least one of the object-side surface and the image-side surface of the fourth lens element is aspheric;
    a fifth lens element with positive refractive power having a convex image-side surface; and
    a sixth lens element with negative refractive power having a concave image-side surface, wherein the sixth lens element is made of plastic material and has at least one of an object-side surface and the image-side surface being aspheric, and the image-side surface of the sixth lens element changes from concave at a paraxial region to convex at a peripheral region;
    wherein a focal length of the optical image system is f, a focal length of the first lens element is f1, a focal length of the second lens element is f2, a focal length of the third lens element is f3, and the following relationships are satisfied:

$0<f/f1+|f/f2|<1.35$; and $0<f3/f1<2.0$.

2. The optical image system of claim 1, wherein the fourth lens element has negative refractive power.

3. The optical image system of claim 2, wherein the focal length of the optical image system is f, a curvature radius of the object-side surface of the fourth lens element is R7, and the following relationship is satisfied:

$-2.5<R7/f<0$.

4. The optical image system of claim 2, wherein an Abbe number of the fourth lens element is V4, an Abbe number of the fifth lens element is V5, and the following relationship is satisfied:

$1.5<V5/V4<3.0$.

5. The optical image system of claim 2, wherein the focal length of the optical image system is f, the focal length of the third lens element is f3, a focal length of the fourth lens element is f4, and the following relationship is satisfied:

$1.0<f/f3+|f/f4|<2.7$.

6. The optical image system of claim 2, wherein the focal length of the first lens element is f1, the focal length of the third lens element is f3, and the following relationship is satisfied:

$0<f3/f1<1.6$.

7. The optical image system of claim 2, wherein the focal length of the optical image system is f, a curvature radius of the object-side surface of the fourth lens element is R7, and the following relationship is satisfied:

$-0.6<R7/f<0$.

8. The optical image system of claim 3, wherein the second lens element has negative refractive power.

9. The optical image system of claim 3, wherein a half of the maximal field of view of the optical image system is HFOV, and the following relationship is satisfied:

$35\ \text{degrees} < HFOV < 0\ \text{degrees}$.

10. The optical image system of claim 3, wherein a sum of the central thickness from the first through sixth lens elements is ΣCT, an axial distance between the object-side surface of the first lens element and the image-side surface of the sixth lens element is TD, and the following relationship is satisfied:

$0.62<\Sigma CT/TD<0.88$.

11. The optical image system of claim 3, wherein an axial distance between the object-side surface of the first lens element and an image plane is TTL, a maximum image height of the optical image system is ImgH, and the following relationship is satisfied:

$TTL/ImgH<2.0$.

12. An optical image system comprising, in order from an object side to an image side:
    a first lens element with positive refractive power having a convex object-side surface;
    second lens element with refractive power;
    a third lens element with positive refractive power having at least one of an object-side surface and an image-side surface being aspheric;
    a fourth lens element with negative refractive power having a concave object-side surface and a convex image-side surface, wherein at least one of the object-side surface and the image-side surface of the fourth lens element is aspheric;
    a fifth lens element with positive refractive power having a convex image-side surface; and
    a sixth lens element with negative refractive power having a concave image-side surface, wherein the sixth lens element is made of plastic material and has at least one of an object-side surface and the image-side surface being aspheric, and the image-side surface of the sixth lens element changes from concave at a paraxial region to convex at a peripheral region;
    wherein a focal length of the optical image system is f, a focal length of the first lens element is f1, a focal length of the third lens element is f3, a focal length of the fourth lens element is f4, and the following relationships are satisfied:

$$0<f3/f1<2.0; \text{ and}$$

$$1.0<|f/f3|+|f/f4|<2.7.$$

13. The optical image system of claim 12, wherein the focal length of the optical image system is f, a curvature radius of the object-side surface of the fourth lens element is R7, and the following relationship is satisfied:

$$-2.5<R7/f<0.$$

14. The optical image system of claim 13, wherein the focal length of the optical image system is f, the focal length of the first lens element is f1, a focal length of the second lens element is f2, and the following relationship is satisfied:

$$0<|f/f1|+|f/f2|<1.35.$$

15. The optical image system of claim 13, wherein an Abbe number of the fourth lens element is V4, an Abbe number of the fifth lens element is V5, and the following relationship is satisfied:

$$1.5<V5/V4<3.0.$$

16. The optical image system of claim 13, wherein the focal length of the first lens element is f1, the focal length of the third lens element is f3, and the following relationship is satisfied:

$$0<f3/f1<1.6.$$

17. The optical image system of claim 14, wherein an axial distance between the object-side surface of the first lens element and an image plane is TTL, a maximum image height of the optical image system is ImgH, and the following relationship is satisfied:

$$TTL/ImgH<2.0.$$

18. An optical image system comprising, in order from an object side to an image side:
   a first lens element with positive refractive power having a convex object-side surface;
   a second lens element with refractive power;
   a third lens element with positive refractive power having at least one of an object-side surface and an image-side surface being aspheric;
   a fourth lens element with refractive power having a concave object-side surface and a convex image-side surface, wherein at least one of the object-side surface and the image-side surface of the fourth lens element is aspheric;
   a fifth lens element with positive refractive power having a convex image-side surface; and
   a sixth lens element with negative refractive power having a concave image-side surface, wherein the sixth lens element is made of plastic material and has at least one of an object-side surface and the image-side surface being aspheric, and the image-side surface of the sixth lens element changes from concave at a paraxial region to convex at a peripheral region;
   wherein a focal length of the optical image system is f, a focal length of the first lens element is f1, a focal length of the second lens element is f2, a focal length of the third lens element is f3, a focal length of the fourth lens element is f4, and the following relationships are satisfied:

$$0<|f/f1|+|f/f2|<1.35; \text{ and}$$

$$1.0<|f/f3|+|f/f4|<2.7.$$

19. The optical image system of claim 18, wherein the fourth lens element has negative refractive power.

20. The optical image system of claim 19; wherein the focal length of the optical image system is f, a curvature radius of the object-side surface of the fourth lens element is R7, and the following relationship is satisfied:

$$-2.5<R7/f<0.$$

21. The optical image system of claim 19, wherein the focal length of the optical image system is f, a curvature radius of the object-side surface of the fourth lens element is R7, and the following relationship is satisfied:

$$-0.6<R7/f<0.$$

22. The optical image system of claim 18, wherein an Abbe number of the fourth lens element is V4 an Abbe number of the fifth lens element is V5, and the following relationship is satisfied:

$$1.5<V5/V4<3.0.$$

23. The optical image system of claim 18, wherein the focal length of the first lens element is f1, the focal length of the third lens element is f3, and the following relationship is satisfied:

$$0<f3/f1<2.0.$$

24. The optical image system of claim 18, wherein a sum of the central thickness from the first through sixth lens elements is ΣCT, an axial distance between the object-side surface of the first lens element and the image-side surface of the sixth lens element is TD, and the following relationship is satisfied:

$$0.62<\Sigma CT/TD<0.88.$$

25. An optical image system comprising, in order from an object side to an image side:
   a first lens element with positive refractive power having a convex object-side surface;
   a second lens element with refractive power;
   a third lens element with positive refractive power having at least one of an object-side surface and an image-side surface being aspheric;
   a fourth lens element with negative refractive power having a concave object-side surface and a convex image-side surface, wherein at least one of the object-side surface and the image-side surface of the fourth lens element is aspheric;
   a fifth lens element with positive refractive power having a convex image-side surface; and
   a sixth lens element with negative refractive power having a concave image-side surface, wherein the sixth lens element is made of plastic material and has at least one of an object-side surface and the image-side surface being aspheric, and the image-side surface of the sixth lens element changes from concave at a paraxial region to convex at a peripheral region;
   wherein a focal length of the first lens element is f1, a focal length of the third lens element is f3, and the following relationship is satisfied:

$$0<f3/f1<2.0.$$

26. The optical image system of claim 25, wherein the focal length of the first lens element is f1, the focal length of the third lens element is f3, and the following relationship is satisfied:

$$0 < f3/f1 < 1.6.$$

27. The optical image system of claim 26, wherein a focal length of the optical image system is f, the focal length of the first lens element is f1 a focal length of the second lens element is f2, and the following relationship is satisfied:

$$0 < f/f1 |f/f2| < 1.35.$$

28. The optical image system of claim 26, wherein a focal length of the optical image system is f, the focal length of the third lens element is f3, a focal length of the fourth lens element is f4, and the following relationship is satisfied:

$$1.0 < f/f3 + |f/f4| < 2.7.$$

* * * * *

UNITED STATES PATENT AND TRADEMARK OFFICE
CERTIFICATE OF CORRECTION

PATENT NO. : 8,643,957 B2  
APPLICATION NO. : 13/615749  
DATED : February 4, 2014  
INVENTOR(S) : Chun-Shan Chen, Tsung-Han Tsai and Ming-Ta Chou Page 1 of 1

It is certified that error appears in the above-identified patent and that said Letters Patent is hereby corrected as shown below:

In the Claims (1) In column 34, line 27, Claim 9 of the issued patent reads as "35 degrees<HFOV<0 degrees", but it should read as "35 degrees<HFOV<50 degrees".

(2) In column 37, line 11, Claim 27 of the issued patent reads as "0< f/f1|f/f2|<1.35", but it should read as "0<f/f1+|f/f2|<1.35".

(3) In column 37, line 17, Claim 28 of the issued patent reads as "1.0< f/f3+|f/f4<2.7", but it should read as "1.0<f/f3+|f/f4|<2.7".

Signed and Sealed this  
Eighteenth Day of November, 2014

Michelle K. Lee  
*Deputy Director of the United States Patent and Trademark Office*